United States Patent
Anzawa et al.

(10) Patent No.: US 12,355,640 B2
(45) Date of Patent: Jul. 8, 2025

(54) SERVICE QUALITY MANAGEMENT SYSTEM

(71) Applicant: NTT DOCOMO, INC., Tokyo (JP)

(72) Inventors: Masashi Anzawa, Tokyo (JP); Hiroki Ishizuka, Tokyo (JP); Akio Gouda, Tokyo (JP); Junichi Sawase, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/641,312

(22) PCT Filed: Jul. 6, 2020

(86) PCT No.: PCT/JP2020/026444
§ 371 (c)(1),
(2) Date: Mar. 8, 2022

(87) PCT Pub. No.: WO2021/049143
PCT Pub. Date: Mar. 18, 2021

(65) Prior Publication Data
US 2022/0353158 A1 Nov. 3, 2022

(30) Foreign Application Priority Data
Sep. 9, 2019 (JP) .................. 2019-163754

(51) Int. Cl.
*H04L 41/5009* (2022.01)
(52) U.S. Cl.
CPC ................ *H04L 41/5009* (2013.01)
(58) Field of Classification Search
CPC ............. H04L 41/5009; H04L 41/5019; H04L 41/5003; H04W 24/02; H04W 28/24; H04M 3/2227
See application file for complete search history.

(56) References Cited

U.S. PATENT DOCUMENTS

| 2006/0245369 | A1* | 11/2006 | Schimmelpfeng | H04L 43/08 370/255 |
| 2007/0116000 | A1* | 5/2007 | Ikeda | H04L 47/32 370/252 |

(Continued)

FOREIGN PATENT DOCUMENTS

| JP | 2004260832 A | 9/2004 |
| JP | 2015005849 A | 1/2015 |
| JP | 2019530363 A | 10/2019 |

OTHER PUBLICATIONS

International Preliminary Report on Patentability issued in International Application No. PCT/JP2020/026444; mailed Mar. 17, 2022 (5 pages).

(Continued)

*Primary Examiner* — Joe Chacko
(74) *Attorney, Agent, or Firm* — Osha Bergman Watanabe & Burton LLP

(57) ABSTRACT

A quality-of-service management system includes a terminal and a server (a quality-of-service management device), the terminal determines whether or not a satisfaction condition is satisfied for a predetermined terminal-side determination item in response to a start request of QoS control from an application or the terminal and transmits a condition determination request for starting QoS control to the server when it is determined that the condition is satisfied, the server determines whether or not the satisfaction condition is satisfied for a predetermined server-side determination item in response to the condition determination request for starting QoS control, and at least one of the terminal and the server starts QoS control when it is determined that the condition is satisfied.

28 Claims, 19 Drawing Sheets

(56) References Cited

U.S. PATENT DOCUMENTS

2010/0020681 A1\* 1/2010 Nakashima ............. H04L 47/10
370/437
2018/0367428 A1\* 12/2018 Di Pietro .............. H04L 41/149

OTHER PUBLICATIONS

Extended European Search Report issued in European Application No. 20863159.8, mailed on Aug. 18, 2023 (10 pages).
Office Action issued in Japanese Application No. 2024-095769; Dated Apr. 22, 2025 (10 pages).

\* cited by examiner

*Fig.5*

| CONTROL REQUEST TYPE | REQUIRED SPECIFICATION |
|---|---|
| BAND CONTROL/DELAY CONTROL | X Mbps / Yms |

Fig.6

| PARAMETER | CONDITION FOR DETERMINING THAT PREDETERMINED QUALITY OF SERVICE CANNOT BE GUARANTEED | DEVICE THAT EXECUTES DETERMINATION |
|---|---|---|
| MOBILE DATA COMMUNICATION SETTING | OFF | TERMINAL |
| CPU USAGE RATE | 90% OR MORE | TERMINAL |
| PRESENCE OR ABSENCE IN BASE STATION AREA IN WHICH QoS CONTROL CAN BE EXECUTED | NO IN-AREA | TERMINAL |
| WHETHER OTHER-PARTY TERMINAL THAT PERFORMS COMMUNICATION WITH OWN TERMINAL CAN GUARANTEE QUALITY OF SERVICE | CANNOT BE GUARANTEED | SERVER |
| DELAY GUARANTEE VALUE OF PLACE AT WHICH MOBILE TERMINAL EXISTS | 100 ms OR MORE | SERVER |
| : | : | : |

Fig.7

| PARAMETER | CONDITION FOR DETERMINING THAT PREDETER | DEVICE THAT EXECUTES DETERMINATION | PARAMETER VALUE | DETERMINATION RESULT | DETERMINATION TIME |
|---|---|---|---|---|---|
| MOBILE DATA COMMUNICATION SETTING | OFF | TERMINAL | ON | POSSIBLE | hh:mm:ss |
| CPU USAGE RATE | 90% OR MORE | TERMINAL | 70% | POSSIBLE | hh:mm:ss |
| PRESENCE OR ABSENCE IN BASE STATION AREA IN WHICH QoS CONTROL CAN BE EXECUTED | NO IN-AREA | TERMINAL | IN-AREA | POSSIBLE | hh:mm:ss |
| ... | ... | ... | ... | ... | ... |

| TIME | DETERMINATION LOG |
|---|---|
| hh:mm:ss | QUALITY OF SERVICE CAN BE GUARANTEED |
| hh:mm:ss | QUALITY OF SERVICE CANNOT BE GUARANTEED |
| hh:mm:ss | QUALITY OF SERVICE CAN BE GUARANTEED |
| : | : |

(b)

| TIME | CONTROL EXECUTION LOG |
|---|---|
| hh:mm:ss | QoS CONTROL_NOT EXECUTED |
| hh:mm:ss | QoS CONTROL_EXECUTED |
| hh:mm:ss | QoS CONTROL_EXECUTED |
| : | : |

*Fig.9*

| PARAMETER | DETERMINATION TIME |
|---|---|
| MOBILE DATA COMMUNICATION SETTING | 10ms |
| CPU USAGE RATE | 100ms |
| PRESENCE OR ABSENCE IN BASE STATION AREA IN WHICH QoS CONTROL CAN BE EXECUTED | 500ms |

Fig. 10

| PARAMETER | CONDITION FOR DETERMINING THAT PREDETERMINED QUALITY OF SERVICE CANNOT BE GUARANTEED | DEVICE THAT EXECUTES DETERMINATION | PARAMETER VALUE | DETERMINATION RESULT | DETERMINATION TIME |
|---|---|---|---|---|---|
| WHETHER OTHER-PARTY TERMINAL THAT PERFORMS COMMUNICATION WITH OWN TERMINAL CAN GUARANTEE QUALITY OF SERVICE | CANNOT BE GUARANTEED | SERVER | CAN BE GUARANTEED | CAN BE GUARANTEED | hh:mm:ss |
| DELAY GUARANTEE VALUE OF PLACE AT WHICH MOBILE TERMINAL EXISTS | 100ms OR MORE | SERVER | 80ms | CAN BE GUARANTEED | hh:mm:ss |
| ... | ... | ... | ... | ... | ... |

Fig.11

| PARAMETER | NUMBER OF TIMES IT IS DETERMINED THAT QUALITY OF SERVICE CANNOT BE GUARANTEED |
|---|---|
| MOBILE DATA COMMUNICATION SETTING | 0 |
| CPU USAGE RATE | 2 |
| PRESENCE OR ABSENCE IN BASE STATION AREA IN WHICH QoS CONTROL CAN BE EXECUTED | 10 |

*Fig.17*

| PARAMETER | CONDITION FOR DETERMINING THAT PREDETERMINED QUALITY OF SERVICE CANNOT BE GUARANTEED | DEVICE THAT EXECUTES DETERMINATION | PARAMETER VALUE | DETERMINATION RESULT | DETERMINATION TIME |
|---|---|---|---|---|---|
| MOBILE DATA COMMUNICATION SETTING | OFF | TERMINAL | ON | POSSIBLE | hh:mm:ss |
| CPU USAGE RATE | 90% OR MORE | TERMINAL | 95% | IMPOSSIBLE | hh:mm:ss |
| PRESENCE OR ABSENCE IN BASE STATION AREA IN WHICH QoS CONTROL CAN BE EXECUTED | NO IN-AREA | TERMINAL | IN-AREA | POSSIBLE | hh:mm:ss |
| WHETHER OTHER-PARTY TERMINAL THAT PERFORMS COMMUNICATION WITH OWN TERMINAL CAN GUARANTEE QUALITY OF SERVICE | CANNOT BE GUARANTEED | SERVER | CAN BE GUARANTEED | CAN BE GUARANTEED | hh:mm:ss |
| DELAY GUARANTEE VALUE OF PLACE AT WHICH MOBILE TERMINAL EXISTS | 100 ms OR MORE | SERVER | 80ms | POSSIBLE | hh:mm:ss |
| : | : | : | : | : | : |

SERVICE QUALITY MANAGEMENT SYSTEM

TECHNICAL FIELD

The present invention relates to a quality-of-service management system.

BACKGROUND ART

A provider that provides a network service is required to provide a certain quality of service (QoS) to users. The provider executes QoS control in order to provide a certain target quality of service. Further, a service level agreement (SLA) may be set for a level of quality of service to be provided between a provider regarding a QoS and a user. When the SLA is set, the provider executes QoS control to guarantee the quality of service set as the SLA. A technology for determining whether or not a network device can provide sufficient resources in response to a service request with respect to the QoS control is known (see, for example, Patent Literature 1).

CITATION LIST

Patent Literature

[Patent Literature 1] Japanese Unexamined Patent Publication No. 2004-260832

SUMMARY OF INVENTION

Technical Problem

In QoS control of which a target is a wired network, a dedicated device, or the like, a network is in a relatively stable state and thus, when the quality of the network under management of a provider is guaranteed, it is easy for a user to enjoy a QoS control service, and management of the SLA is completed with resources within a category of management of the provider. However, in QoS control of which a target is a mobile terminal, an application operating in the mobile terminal, or the like, since a communication status including a status of the network greatly changes due to factors other than jurisdiction of the provider, such as change in an in-area status of a mobile terminal or a behavior of software in the mobile terminal, it is easy for provision of a certain quality of service to be difficult, and QoS control cannot be executed in some cases. Further, it is difficult for the provider to specify a cause of a case in which quality of service cannot be provided.

Therefore, the present invention has been made in view of the above problems, and an object of the present invention is to realize providing of appropriate QoS control based on a determination of whether or not quality of service can be guaranteed and whether or not QoS control can be executed, and specifying of a cause of a case in which quality of service cannot be guaranteed and QoS control cannot be executed, with respect to QoS control of which a target is an application or a terminal in which the application is executed.

Solution to Problem

In order to solve the above problem, a quality-of-service management system according to an embodiment of the present invention is a quality-of-service management system including a terminal configured to execute an application, and a quality-of-service management device configured to manage a status of QoS control regarding quality of service of communication, a target of the QoS control being the application or the terminal, wherein the terminal includes a first determination unit configured to acquire a parameter value corresponding to each of terminal-side determination items and determine whether or not the parameter value satisfies a satisfaction condition, with respect to one or more terminal-side determination items having a predetermined parameter acquirable by the terminal and the satisfaction condition to be satisfied for the parameter defined in association with each other, in response to a Start request of QoS control from the application or the terminal; and a request unit configured to transmit a condition determination request for starting QoS control to the quality-of-service management device when the first determination unit determines that the parameter value of each terminal-side determination item satisfies the satisfaction condition, the quality-of-service management device includes a second determination unit configured to acquire a parameter value corresponding to each of quality-of-service management device-side determination items and determine whether or not the parameter value satisfies the satisfaction condition, with respect to one or more quality-of-service management device-side determination items having a predetermined parameter acquirable by the quality-of-service management device and a satisfaction condition to be satisfied for the parameter defined in association with each other, when the condition determination request for starting QoS control is acquired from the terminal, and at least one of the terminal and the quality-of-service management device starts the QoS control when the second determination unit determines that the parameter value of each quality-of-service management device-side determination item satisfies the corresponding satisfaction condition.

According to the above embodiment, first, the terminal determines whether or not the parameter regarding the QoS control satisfies a predetermined satisfaction condition, the quality-of-service management device determines whether or not the parameter satisfies the predetermined satisfaction condition when the terminal determines that the parameter satisfies the satisfaction condition, and QoS control is started when the quality-of-service management device determines that the parameter satisfies the satisfaction condition. Therefore, since the QoS control is not executed when there is a factor of a case in which quality of service cannot be guaranteed or a factor of a case in which the QoS control cannot be executed, it is possible to provide appropriate QoS control. Further, since the quality-of-service management device determines whether or not the parameter satisfies the predetermined satisfaction condition only when the terminal determines that the parameter satisfies the predetermined satisfaction condition, unnecessary determination processing is prevented from being executed in the quality-of-service management device when the satisfaction condition is not satisfied on the terminal side. Further, since it is determined whether or not the parameter satisfies the condition in each of the terminal and the quality-of-service management device, it is possible to specify a cause of a case in which the condition is not satisfied. Further, it is possible to prevent a denial of service attack (DOS) attack from an unauthorized application.

Advantageous Effects of Invention

It is possible to realize providing of appropriate QoS control based on a determination of whether or not quality of service can be guaranteed and whether or not the QoS control can be executed, and specifying of a cause of a case in which quality of service cannot be guaranteed and QoS control cannot be executed, with respect to QoS control of which a target is an application or a terminal in which the application is executed.

BRIEF DESCRIPTION OF DRAWINGS

FIG. 5 is a diagram schematically illustrating content of a start request of QoS control.

FIG. 6 is a diagram illustrating an example of determination items.

FIG. 7 is a diagram illustrating an example of a determination result for a terminal-side determination item.

FIG. 8(a) is a diagram illustrating an example of a determination log that is another example of first log information.

FIG. 8(b) is a diagram illustrating an example of a control execution log that is another example of the first log information.

FIG. 9 is a diagram illustrating an example of a log in which a determination time of a determination item in a terminal has been recorded.

FIG. 10 is a diagram illustrating an example of a determination result for a server-side determination item.

FIG. 11 is a diagram illustrating an example of a log in which the number of times it is determined that a parameter of each determination item does not satisfy a condition in the terminal is recorded.

FIG. 17 is a diagram illustrating an example of determination results for determination items on the terminal side and the server side after start of QoS control.

DESCRIPTION OF EMBODIMENTS

An embodiment of a quality-of-service management system according to the present invention will be described with reference to the drawings. If possible, the same portions are denoted by the same reference signs, and repeated description thereof will be omitted.

Figure 1:
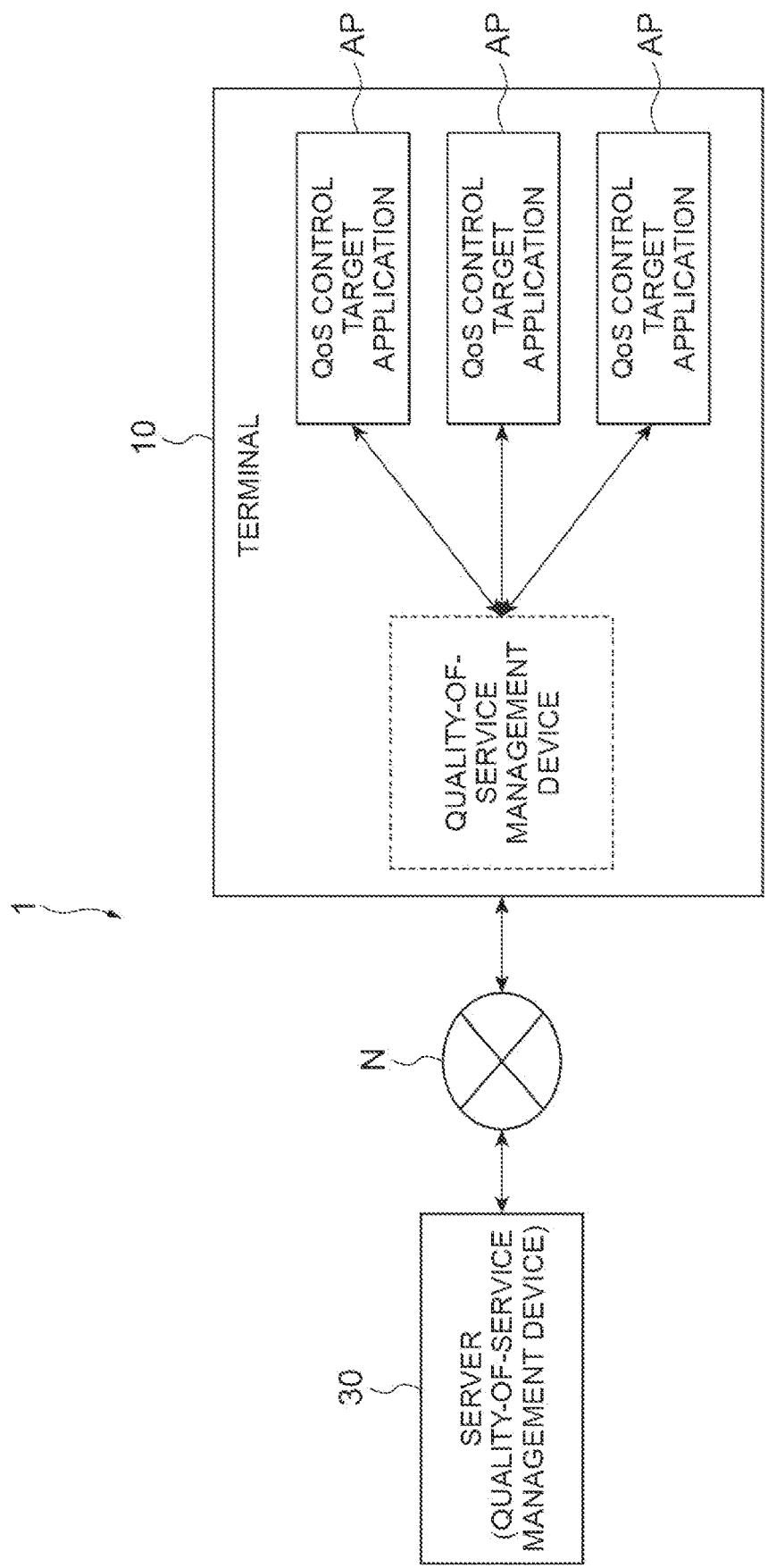
FIG. 1 is a diagram illustrating an apparatus configuration of a quality-of-service management system of an embodiment.

FIG. 1 is a diagram illustrating an apparatus configuration of a quality-of-service management system according to the present embodiment. As illustrated in FIG. 1, the quality-of-service management system 1 includes a terminal 10 and a server 30 configured to be able to communicate with each other via a network N. The server 30 constitutes a quality-of-service management device on the server side. In the present embodiment, an example in which the quality-of-service management device is configured of the server 30 is shown, but the present invention is not limited to this example. The quality-of-service management device may be configured of another device and may be configured of, for example, a network device for forming a network. The server 30 may exist on the network N. The terminal 10 may constitute a quality-of-service management device on the terminal side.

The terminal 10 includes a QoS control target application AP (hereinafter referred to as "application AP"). The QoS control is executed to provide the application AP with a certain quality of service regarding a network that is a target regarding a communication band, a delay time, or the like. Further, the QoS control may be executed to provide the terminal 10 with a certain quality of service regarding the network. That is, the server 30 may execute the QoS control to provide a quality of service regarding network communication to the application AP or the terminal 10. Further, the terminal 10 may execute the QoS control to guarantee the quality of service. When an SLA is set, the server 30 or the terminal 10 may execute the QoS control to guarantee the quality of service set for the SLA. Hereinafter, an example in which an SLA is set will be described in the present embodiment. That is, the terminal 10 and the server 30 executes the QoS control to guarantee the quality of service set in the SLA.

Figure 2:
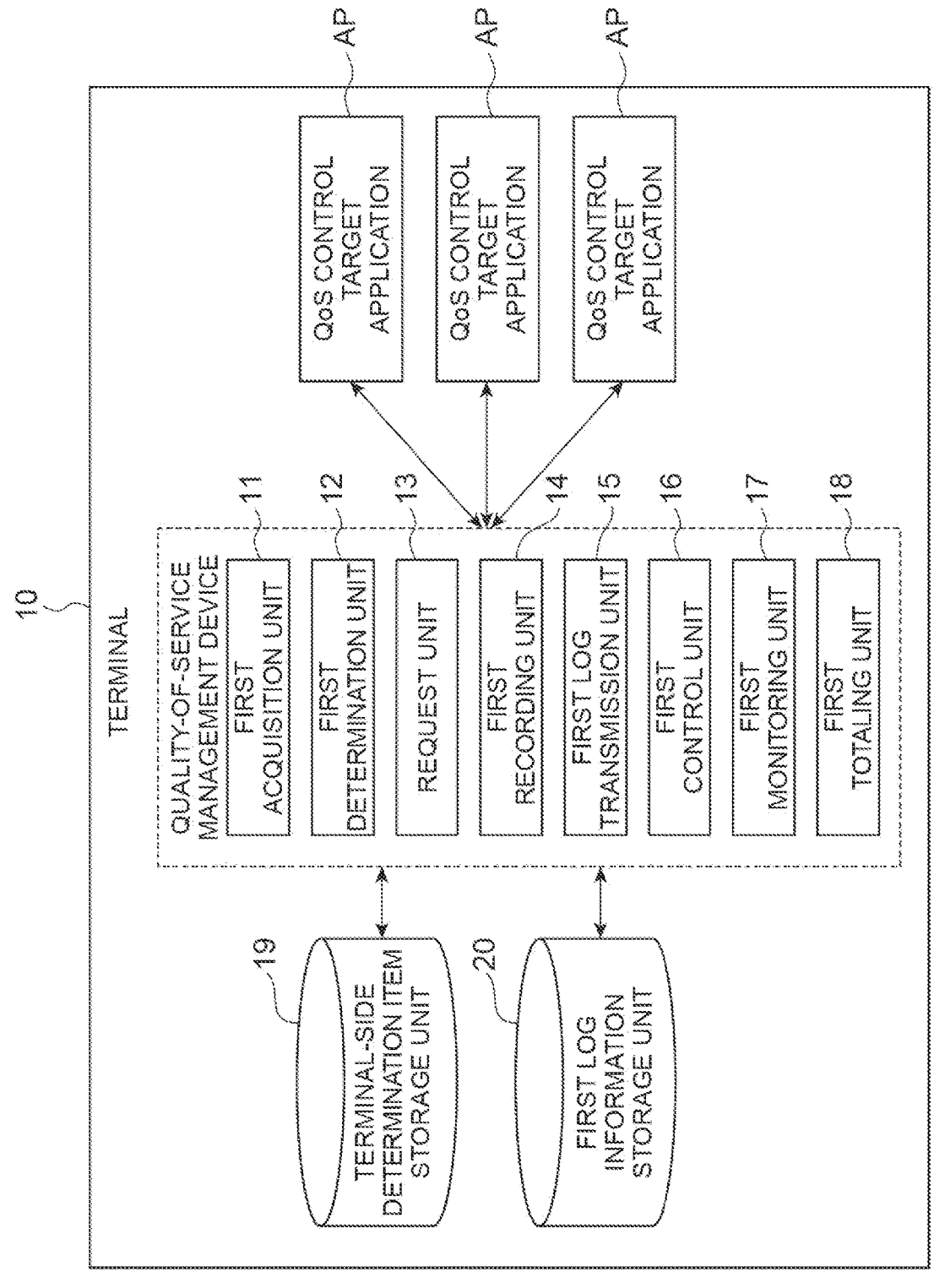
FIG. 2 is a block diagram illustrating a functional configuration of a terminal constituting a quality-of-service management device.

FIG. 2 is a diagram illustrating a functional configuration of the terminal 10 constituting the quality-of-service management device. As illustrated in FIG. 2, the terminal 10 includes a first acquisition unit 11, a first determination unit 12, a request unit 13, a first recording unit 14, a first log transmission unit 15, a first control unit 16, a first monitoring unit 17, and a first totaling unit 18. The respective functional units 11 to 18 configure the quality-of-service management device on the terminal side and execute QoS control for the application AP. Further, each of the functional units 11 to 18 is configured to be able to access a storage means such as the terminal-side determination item storage unit 19 and the first log information storage unit 20. In the example illustrated in FIG. 2, the terminal-side determination item storage unit 19 and the first log information storage unit 20 are configured to be inside the terminal 10, but may be configured to be outside the terminal 10.

Figure 3:
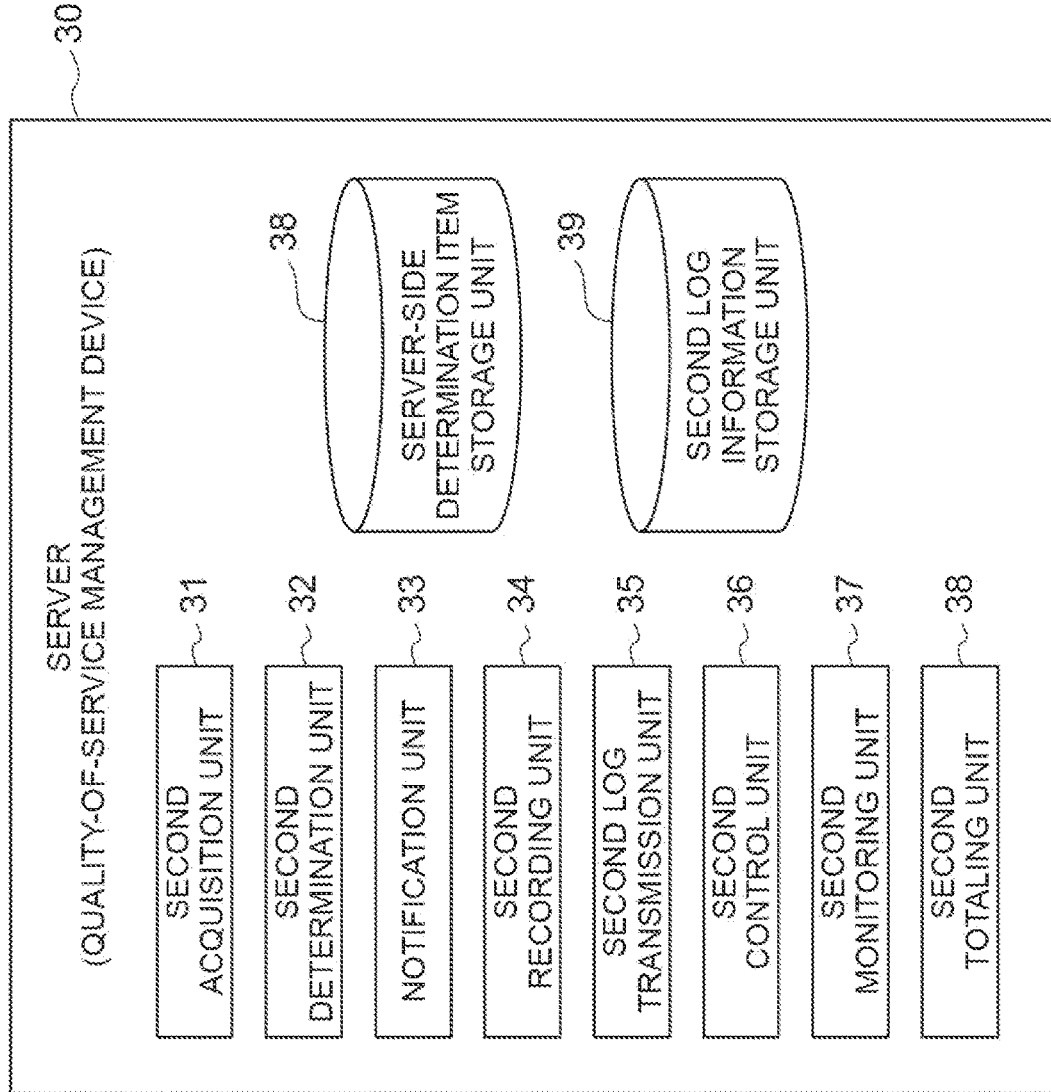
FIG. 3 is a block diagram illustrating a functional configuration of a server constituting the quality-of-service management device.

FIG. 3 is a diagram illustrating a functional configuration of the server 30 constituting the quality-of-service management device. As illustrated in FIG. 3, the server 30 includes a second acquisition unit 31, a second determination unit 32, a notification unit 33, a second recording unit 34, a second log transmission unit 35, a second control unit 36, a second monitoring unit 37, and a second totaling unit 38. Each of the functional units 31 to 37 is configured to be accessible to a storage means such as a server-side determination item storage unit 38 and a second log information storage unit 39. In the example illustrated in FIG. 3, the server-side determination item storage unit 38 and the second log information storage unit 39 are configured inside the server 30, but may be configured outside the server 30.

The block diagrams illustrated in FIGS. 2 and 3 show blocks in units of functions. These functional blocks (constituent units) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include determining, judging, calculating, computing, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but the present disclosure is not limited thereto. For example, a functional block (a component) caused to function to perform transmission is referred to as a transmitting unit or a transmitter. In any case, a realizing method is not particularly limited, as described above.

Figure 4:
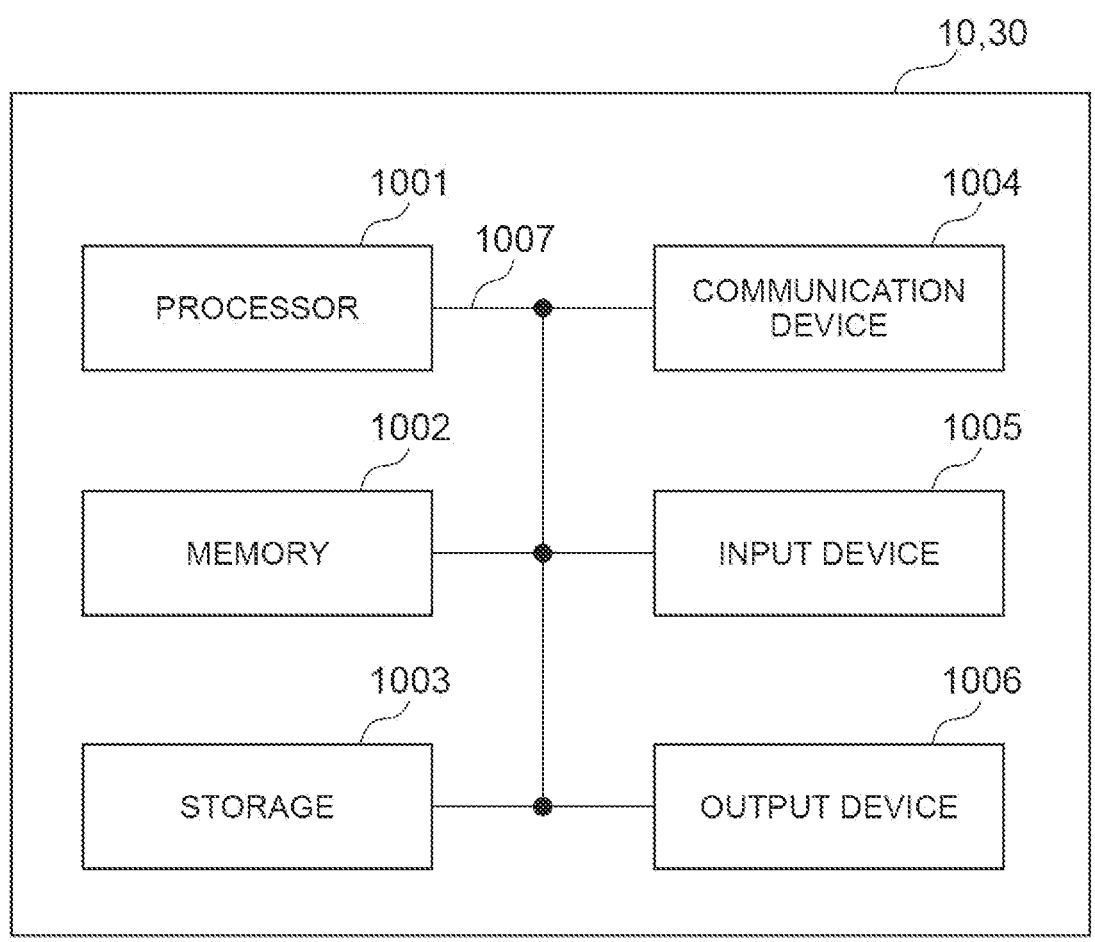
FIG. 4 is a hard block diagram of a terminal and a server constituting the quality-of-service management device.

For example, the terminal 10 and the server 30 in an embodiment of the present invention may function as a computer. FIG. 4 is a diagram illustrating an example of a hardware configuration of the terminal 10 and the server 30 according to the present embodiment. Each of the terminal 10 and the server 30 may be physically configured as computer devices including a processor 1001, a memory 1002, a storage 1003, a communication device 1004, an input device 1005, an output device 1006, a bus 1007, and the like.

In the following description, a word "device" can be read as a circuit, device, unit, or the like. The hardware configuration of the terminal 10 and the server 30 may be configured to include one or more of the devices illustrated in FIG. 4 or may be configured not to include some of the devices.

Respective functions of the terminal 10 and the server 30 are realized by predetermined software (program) being loaded onto hardware such as the processor 1001 and the memory 1002 so that the processor 1001 performs calculation and by controlling communication using the communication device 1004 and reading and/or writing of data in the memory 1002 and the storage 1003.

The processor 1001 operates, for example, an operating system to control the entire computer. The processor 1001 may be configured of a central processing unit (CPU) including an interface with peripheral devices, a control device, a calculation unit, a register, and the like. For example, the respective functional units 11 to 18 and 31 to 37 illustrated in FIGS. 2 and 3 may be realized by the processor 1001.

Further, the processor 1001 reads a program (program code), a software module, or data from the storage 1003 and/or the communication device 1004 into the memory 1002, and executes various processing according to the program, the software module, or the data. As the program, a program that causes a computer to execute at least some of operations described in the above-described embodiment is used. For example, the functional units 11 to 18 and 31 to 37 of the terminal 10 and the server 30 may be realized by a control program stored in the memory 1002 and operated by the processor 1001. Although a case in which the various processing described above are executed by one processor 1001 has been described, the processing may be executed simultaneously or sequentially by two or more processors 1001. The processor 1001 may be mounted on one or more chips. The program may be transmitted from a network via a telecommunication line.

The memory 1002 is a computer-readable recording medium, and may be configured of, for example, at least one of a read only memory (ROM), an erasable programmable ROM (EPROM), an electrically erasable programmable ROM (EEPROM), and a random access memory (RAM). The memory 1002 may also be referred to as a register, a cache, a main memory (main storage device), or the like. The memory 1002 can store a program (program code), a software module, or the like that can be executed to execute the quality-of-service management method according to an embodiment of the present invention.

The storage 1003 is a computer-readable recording medium and may be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including the memory 1002 and/or the storage 1003, a server, or another appropriate medium.

The communication device 1004 is hardware (a transmission and reception device) for performing communication between computers via a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that executes output to the outside. The input device 1005 and the output device 1006 may have an integrated configuration (for example, a touch panel).

Further, each device such as the processor 1001 or the memory 1002 is connected by the bus 1007 for communicating information. The bus 1007 may be configured of a single bus or may be configured of different buses between devices.

Further, the terminal 10 and the server 30 may include hardware such as a microprocessor, a digital signal processor (DSP), an application specific integrated circuit (ASIC), a programmable logic device (PLD), and a field programmable gate array (FPGA), and some or all of respective functional blocks may be realized by the hardware. For example, the processor 1001 may be mounted using at least one of these pieces of hardware.

Next, the respective functional units of the terminal 10 will be described. The first acquisition unit 11 acquires a start request of QoS control from the application AP. FIG. 5 is a diagram schematically illustrating content of the start request of QoS control. As illustrated in FIG. 5, the start request of QoS control includes information indicating a control request type. Further, the start request of QoS control may include information indicating a required specification in the type. It is not essential to include the required specification in the start request of QoS control. When the SLA is set for the application AP that is a QoS control target, a required specification corresponding to the quality of service set as the SLA may be included in the start request of QoS control. The information indicating the control request type indicates, for example, whether the type is band control or delay control. Further, the information indicating the required specification indicates, for example, a guaranteed value of a band or a guaranteed value of a delay value. The start request of QoS control may be issued from the terminal 10. In this case, the first acquisition unit 11 acquires the start request of QoS control from the terminal 10.

The first determination unit 12 executes a determination regarding a predetermined determination item for guaranteeing a predetermined quality of service regarding communication when a start request of QoS control is acquired. Specifically, the first determination unit 12 determines the terminal-side determination item, which is a determination item to be determined by the terminal 10. The terminal-side determination item storage unit 19 is a storage means that stores information on the terminal-side determination item.

In the terminal-side determination item, a parameter that can be acquired by the terminal 10 and a condition for guaranteeing the predetermined quality of service regarding the parameter are defined in association with each other. The first determination unit 12 acquires a parameter value corresponding to each terminal-side determination item, and determines whether or not the parameter value satisfies a condition.

FIG. 6 is a diagram illustrating an example of determination items. As illustrated in FIG. 6, each determination item includes a parameter, and a condition for determining that the predetermined quality of service cannot be guaranteed. The terminal-side determination item storage unit 19 stores the determination item for which the "device that executes the determination" is the "terminal" among the determination items illustrated in FIG. 6, as the terminal-side determination item, and the first determination unit 12 executes a determination regarding the terminal-side determination item stored in the terminal-side determination item storage unit 19. The first determination unit 12 determines that the predetermined quality of service can be guaranteed when each parameter of the terminal-side determination item does not correspond to the condition for determining that the predetermined quality of service cannot be guaranteed. The first determination unit 12 may execute the determination regarding all the terminal-side determination items or may execute the determination regarding some of the terminal-side determination items at each determination trigger. Further, the terminal-side determination item that is a determination target may be dynamically changed at each determination trigger.

FIG. 7 is a diagram illustrating an example of a determination result for the terminal-side determination item in the first determination unit 12. For example, the first determination unit 12 acquires a parameter value (ON/OFF) of a "mobile data communication setting" via an application programming interface (API) in the terminal, and determines that predetermined quality of service cannot be guaranteed when the parameter value is OFF. When the parameter value is ON as illustrated in FIG. 7, the first determination unit 12 determines that the predetermined quality of service can be guaranteed.

Further, the first determination unit 12 acquires a CPU usage rate of the terminal 10 via the API, determines that the predetermined quality of service cannot be guaranteed when the CPU usage rate is 90% or more, and determines that the predetermined quality of service can be guaranteed when the CPU usage rate is not 90% or more. When a parameter value of the CPU usage rate is 70% as illustrated in FIG. 7, the first determination unit 12 determines that the predetermined quality of service can be guaranteed.

Further, the first determination unit 12 acquires a parameter value indicating "presence or absence in a base station area in which QoS control can be executed" via the API, and determines that quality of service cannot be guaranteed when the parameter value indicates no in-area. The parameter value acquired here may be based on radio access technology (RAT) information, GPS information, or the like in a communication system such as so-called 3G, long term evolution (LTE), 4G, or 5G. As illustrated in FIG. 7, when the parameter value indicates in-area, the first determination unit 12 determines that the predetermined quality of service can be guaranteed. In the present embodiment, the parameter "presence or absence in a base station area in which QoS control can be executed" is illustrated as one of the terminal-side determination items, but may be one of server-side determination items.

The request unit 13 transmits a quality-of-service guarantee determination request (condition determination request for starting QoS control) to the server 30 when the first determination unit 12 determines that the respective parameter values of all of the terminal-side determination items that are determination targets satisfy the respective conditions for guaranteeing the quality of service. Thus, since the server 30 determines whether or not the quality of service can be guaranteed only when the terminal 10 determines that the quality of service can be guaranteed, unnecessary determination processing is prevented from being executed in the server 30 when the quality of service cannot be guaranteed on the terminal 10 side.

The first recording unit 14 records the first log information including the result of the processing regarding each terminal-side determination item in the first determination unit 12. Specifically, the first recording unit 14 may record the result of the determination regarding each terminal-side determination item in the first determination unit 12 as the first log information, as illustrated in a table of FIG. 7. Further, as illustrated in FIG. 7, each record of the first log information may include a time when the determination has been executed. The first recording unit 14 stores the first log information in the first log information storage unit 20, which is a storage means for recording the first log information.

FIG. 8 is a diagram illustrating another example of the first log information recorded in the first log information storage unit 20 by the first recording unit 14. The first recording unit 14 may record, as the first log information, that it has been determined that the quality of service can be guaranteed or that it has been determined that the quality of service cannot be guaranteed when the first determination unit 12 has determined that respective parameter values of all of the terminal-side determination items that are determination target satisfy conditions.

As illustrated in FIG. 8(a), the first recording unit 14 can record, as the first log information, a determination log indicating that it has been determined that the quality of service can be guaranteed or that it has been determined that the quality of service cannot be guaranteed. A time may be associated with each determination log. The first log information including the determination log indicating that it has been determined that the quality of service can be guaranteed or that it has been determined that the quality of service cannot be guaranteed may not be accompanied by the determination result for each terminal-side determination item.

Further, the first recording unit 14 may record the number of times it is determined that the quality of service can be guaranteed as the first log information. Further, the first recording unit 14 may record the number of times it is determined that the quality of service cannot be guaranteed as the first log information. The first log information including the number of times it is determined that the quality of service can be guaranteed or the number of times it is determined that the quality of service cannot be guaranteed may not be accompanied by the determination result for each terminal-side determination item.

Further, the first recording unit 14 records, as the first log information, that the QoS control has been executed by the server 30 or the terminal 10 when the second determination unit 32 of the server 30 has determined that the quality of service can be guaranteed for the server-side determination item, in addition to the first determination unit 12 determining that the quality of service can be guaranteed, or that the QoS control has not been executed because the second determination unit 32 has determined that the quality of service cannot be guaranteed.

As illustrated in FIG. 8(*b*), the first recording unit 14 can record a control execution log indicating that the QoS control has been executed or the QoS control has not been executed as the first log information. A time may be associated with each control execution log. The first log information including the control execution log indicating that the QoS control has been executed or the QoS control has not been executed may not be accompanied by the determination result for each terminal-side determination item.

Further, the first recording unit 14 may record the number of times the QoS control has been executed as the first log information. Further, the first recording unit 14 may record the number of times that the QoS control has not been executed as the first log information. The first log information including the number of times the QoS control has been executed or the number of times the QoS control has not been executed may not be accompanied by the determination result for each terminal-side determination item.

The first log transmission unit 15 transmits the first log information recorded by the first recording unit 14 to the server at a predetermined trigger. The predetermined trigger may be, for example, that a preset predetermined time has elapsed. By the log information being transmitted to the server 30 in this way, sharing between the terminal and the server of information on a cause of a case in which the predetermined quality of service cannot be guaranteed can be realized.

The first control unit 16 starts QoS control for the application AP when receiving guarantee determination information (quality of service determination information) indicating that predetermined quality of service can be guaranteed for all of the server-side determination items that are determination targets from the server 30. Thus, the QoS control is executed on the basis of the guarantee determination information from the server 30 and, thus, since the QoS control is not executed when there is a factor of a case in which the predetermined quality of service cannot be guaranteed, it is possible to provide appropriate QoS control. Determination processing for the determination item in the server 30 will be described below.

The first monitoring unit 17 monitors communication information indicating a communication status of the application AP or the terminal 10 that is a QoS control target. The communication information includes, for example, band information or a delay value depending on content of guarantee in the QoS control (for example, guarantee of a band or guarantee of a delay value) or content of target network quality. The first determination unit 12 executes the determination regarding the terminal-side determination items as described above when the communication status shown in the communication information monitored by the first monitoring unit 17 becomes a status in which predetermined quality of service is not satisfied during execution of the QoS control.

Thus, since the determination regarding each terminal-side determination item is executed when the communication status of the application or the terminal 10 is monitored and the communication status becomes a status in which the quality of service is not satisfied, it becomes possible to specify a cause of a case in which quality of service cannot be guaranteed due to an event that has occurred on the terminal 10 side.

An example of a determination of an order of determination processing for a plurality of terminal-side determination items in the first determination unit 12 will be described herein. In order to determine the order of the determination processing, the first recording unit 14 records a determination time required for a determination of each terminal-side determination item in the first determination unit 12, which is included in the first log information.

FIG. 9 is a diagram illustrating an example of a log in which the determination time for the terminal-side determination item in the terminal 10 has been recorded. Specifically, the first recording unit 14 executes determination processing in a random order in an initial determination of each terminal-side determination item, and records the determination time required for a determination of each terminal-side determination item as the first log information, as illustrated in FIG. 9.

The first determination unit 12 may execute the determinations of the respective terminal-side determination items in ascending order of the determination times by referring to the determination time recorded as the first log information, as illustrated in FIG. 9, at the time of a determination of each terminal-side determination item at the next time and subsequent times. According to the example illustrated in FIG. 9, the first determination unit 12 executes determination processing in an order of "mobile data communication setting", "CPU usage rate", and "presence or absence in a base station area in which QoS control can be executed".

Thus, the determinations of the terminal-side determination items are executed in ascending order of the determination times of the respective terminal-side determination items, thereby shortening the time required to specify a cause of a case in which the predetermined quality of service cannot be guaranteed.

The respective functional units of the server 30 will be described with reference to FIG. 3. The second acquisition unit 31 acquires the quality-of-service guarantee determination request from the request unit 13 of the terminal 10.

The second determination unit 32 executes a determination regarding a predetermined determination item for guaranteeing the predetermined quality of service regarding communication when the quality-of-service guarantee determination request is acquired by the second acquisition unit 31. Specifically, the second determination unit 32 determines the server-side determination item (quality-of-service management device-side determination item), which is a determination item to be determined by the server 30. The server-side determination item storage unit 38 is a storage means that stores information on the server-side determination item.

In the server-side determination item, a parameter that can be acquired by the server 30 and a condition for guaranteeing the predetermined quality of service regarding the parameter are defined in association with each other. The second determination unit 32 acquires a parameter value corresponding to each server-side determination item, and determines whether or not the parameter value satisfies a condition.

Here, FIG. 6 is referred to again. The second determination unit 32 sets the determination item for which the "device that executes the determination" is the "server" among the determination items illustrated in FIG. 6 as the server-side determination item and executes the determination. The second determination unit 32 determines that the predetermined quality of service can be guaranteed when each parameter of the server-side determination item does not correspond to the condition for determining that the predetermined quality of service cannot be guaranteed. The second determination unit 32 may execute the determination regarding all the server-side determination items or may execute the determination regarding some of the server-side determination items at each determination trigger. Further, the server-side determination item that is a determination target may be dynamically changed at each determination trigger.

FIG. 10 is a diagram illustrating an example in which a determination result for the server-side determination item in the second determination unit 32 is added to the example of the determination result for the terminal-side determination item as illustrated in FIG. 7. For example, the second determination unit 32 acquires information indicating "whether an other-party terminal that performs communication with the own terminal can guarantee the quality of service" as a parameter, and a determination result for whether the quality of service can be guaranteed in the other-party terminal as a parameter value, and determines that the predetermined quality of service cannot be guaranteed when the parameter value is "cannot be guaranteed".

As described above, in the present embodiment, the parameter "presence or absence in a base station area in which QoS control can be executed" is illustrated as one of the terminal-side determination items, but may be one of the server-side determination items. That is, the second determination unit 32 may acquire the parameter value indicating "presence or absence in a base station area in which QoS control can be executed" via the API, and determine that the predetermined quality of service cannot be guaranteed when the parameter value indicates no in-area.

An example in which the determination result in the other-party terminal is required in the determination of the server-side determination item will be described herein.

The second determination unit 32 requests the other-party terminal to execute a determination as to whether or not the predetermined quality of service regarding communication can be guaranteed and to return determination result information indicating a result of the determination when the application AP that is a QoS control target in the terminal 10 requests communication based on a peer to peer (P2P) scheme between the terminal 10 and the other-party terminal different from the terminal 10. The other-party terminal that has received the request executes determination processing regarding the terminal-side determination item as that in the terminal 10 as described with reference to FIGS. 6 and 7, and returns determination result information indicating a result of the determination to the server 30. The second determination unit 32 executes a determination regarding other server-side determination items when determination result information indicating that the predetermined quality of service can be guaranteed is returned from the other-party terminal.

Thus, when it is determined that the predetermined quality of service can be guaranteed in the other-party terminal, it is determined in the server 30 whether or not quality of service other than matters regarding the other-party terminal can be guaranteed, and the QoS control is executed when it is determined that the quality of service can be guaranteed, making it possible to provide an appropriate QoS control in consideration of the status of the other-party terminal.

Referring back to FIG. 10, the second determination unit 32 acquires a parameter value of a "delay guarantee value of a place at which a mobile terminal exists" (hereinafter referred to as "delay guarantee value"), and determines that the predetermined quality of service cannot be guaranteed when the delay guarantee value is 100 ins or more.

The server-side determination item can include an item for which it is determined whether or not a corresponding condition is satisfied by referring to position information of the terminal 10. For example, the "delay guarantee value" is acquired on the basis of position information indicating a position of the terminal 10. Specifically, the request unit 13 of the terminal 10 transmits the position information indicating the position of the terminal 10 to the server 30 together with the quality-of-service guarantee determination request.

The second determination unit 32 acquires the delay guarantee value for the terminal 10 as the parameter value on the basis of the position information of the terminal 10 by referring to a delay guarantee map in which a geographical range and a delay guarantee value are associated with each other. The second determination unit 32 determines whether or not the acquired parameter value corresponds to "the condition for determining that the predetermined quality of service cannot be guaranteed". When the parameter value is 80 ins as illustrated in FIG. 10, the second determination unit 32 determines that the predetermined quality of service can be guaranteed.

The notification unit 33 notifies the terminal 10 of the guarantee determination information including the determination result for the server-side determination item in the second determination unit 32. When the notification unit 33 transmits, to the terminal 10, the guarantee determination information indicating that the predetermined quality of service can be guaranteed for all of the server-side determination items that are determination targets, the first control unit 16 of the terminal 10 starts QoS control for the application AP.

The second recording unit 34 records second log information including the result of the processing regarding each server-side determination item in the second determination unit 32. Specifically, the second recording unit 34 may record the result of the determination regarding each server-side determination item (a determination item for which the "device that executes the determination" is the "server") in the second determination unit 32 as the second log information, as illustrated in the table of FIG. 10. Further, each record of the second log information may include the time when the determination has been executed, as illustrated in FIG. 10. The second recording unit 34 stores the second log information in the second log information storage unit 39, which is a storage means for recording the second log information.

The second recording unit 34 may record, as the second log information, that it has been determined that the quality of service can be guaranteed or that it has been determined that the quality of service cannot be guaranteed when the second determination unit 32 has determined that respective parameter values of all of the server-side determination items that are determination targets satisfy conditions, similar to the example of the first log information illustrated in FIG. 8.

The second recording unit 34 can record, as the second log information, a determination log indicating that it has been determined that the quality of service can be guaranteed or that it has been determined that the quality of service cannot be guaranteed, similar to the example of the determination log illustrated in FIG. 8(*a*). A time may be associated with each determination log. The second log information including the determination log indicating that it has been determined that the quality of service can be guaranteed or that it has been determined that the quality of service cannot be guaranteed may not be accompanied by the determination result for each server-side determination item.

Further, the second recording unit 34 may record the number of times it is determined that the quality of service can be guaranteed as the second log information.

Further, the second recording unit 34 may record the number of times it is determined that the quality of service cannot be guaranteed as the second log information. The second log information includes the number of times it is determined that the quality of service can be guaranteed or the number of times it is determined that the quality of service cannot be guaranteed may not be accompanied by the determination result for each server-side determination item.

Further, the second recording unit 34 records, as the second log information, that the QoS control has been executed by the server 30 or the terminal 10 when the second determination unit 32 has determined that the quality of service can be guaranteed, in addition to the first determination unit 12 of the terminal 10 determining that the quality of service can be guaranteed, or that the QoS control has not been executed because the second determination unit 32 has determined that the quality of service cannot be guaranteed.

The second recording unit 34 can record a control execution log indicating that the QoS control has been executed or the QoS control has not been executed as the second log information, similar to the control execution log illustrated in FIG. 8(*b*). A time may be associated with each control execution log. The second log information including the control execution log indicating that the QoS control has been executed or the QoS control has not been executed may not be accompanied by the determination result for each server-side determination item.

Further, the second recording unit 34 may record the number of times the QoS control has been executed as the second log information. Further, the second recording unit 34 may record the number of times that the QoS control has not been executed as the second log information. The second log information including the number of times the QoS control has been executed or the number of times the QoS control has not been executed may not be accompanied by the determination result for each server-side determination item.

The second log transmission unit 35 transmits the second log information recorded by the second recording unit 34 to the terminal 10 at a predetermined trigger. The predetermined trigger may be, for example, that a preset predetermined time has elapsed. By the log information being transmitted to the terminal 10 in this way, sharing between the terminal 10 and the server 30 of information on a cause of a case in which the predetermined quality of service cannot be guaranteed can be realized.

The second control unit 36 starts QoS control for the application AP or the terminal 10 when it is determined that the predetermined quality of service can be guaranteed for all of the server-side determination items that are determination targets.

The second monitoring unit 37 monitors communication information indicating the communication status of the application AP or the terminal 10 that is a QoS control target. The communication information includes, for example, band information or a delay value depending on content of guarantee in the QoS control (for example, guarantee of a band or guarantee of a delay value) or content of target network quality. The second determination unit 32 executes the determination regarding the server-side determination items as described above when the communication status shown in the communication information monitored by the second monitoring unit 37 becomes a status in which the predetermined quality of service is not satisfied during execution of the QoS control.

An example of a determination of a priority of the determination processing for each determination item based on the past determination result for each determination item in the first determination unit 12 and the second determination unit 32 will be described herein. The terminal 10 includes the first totaling unit 18 for a determination of the priority of the determination processing. Further, the server 30 includes the second totaling unit 38.

The first totaling unit 18 statistically totals, for each terminal-side determination item, the number of times it is determined that the parameter value of the terminal-side determination item does not satisfy the condition. Specifically, the first totaling unit 18 acquires the first log information stored in the first log information storage unit 20, and totals the number of times it is determined that the parameter value of the terminal-side determination item does not satisfy the conditions on the basis of the acquired first log information.

FIG. 11 is a diagram illustrating a result of totaling the number of times it is determined that the quality of service cannot be guaranteed, that is, the number of times it is determined that the parameter value does not satisfy the condition, for each terminal-side determination item, in the first totaling unit 18. As illustrated in FIG. 11, the number of times it is determined that the quality of service cannot be guaranteed is 0 for "mobile data communication setting" that is one of the terminal-side determination items. Further, for the terminal-side determination item "CPU usage rate", the number of times it is determined that the quality of service cannot be guaranteed is 2. Further, with respect to the terminal-side determination item "presence or absence in a base station area in which QoS control can be executed", the number of times it is determined that quality of service cannot be guaranteed is 10 times.

Further, the second totaling unit 38 statistically totals, for each server-side determination item, the number of times it is determined that the parameter value of the server-side determination item does not satisfy the condition. Specifically, the second totaling unit 38 acquires the second log information stored in the second log information storage unit 39, and totals the number of times it is determined that the parameter value of the server-side determination item does not satisfy the condition on the basis of the acquired second log information.

The first determination unit 12 executes a determination of the terminal-side determination item highly likely to be determined not to satisfy the condition preferentially in a frequency or order on the basis of a result of statistical totaling in the first totaling unit 18. According to the example illustrated in FIG. 11, the first determination unit 12 executes determination processing in an order of "presence or absence in a base station area in which QoS control can be executed", "CPU usage rate", and "mobile data communication setting". Further, the first determination unit 12 may execute a determination so that a frequency of determination processing of "presence or absence in a base station area in which QoS control can be executed" among the three terminal-side determination items illustrated in FIG. 11 becomes highest.

Further, the second determination unit 32 may execute a determination of the server-side determination item highly likely to be determined not to satisfy the condition on the basis of the result of the statistical totaling in the second totaling unit 38, preferentially in a frequency or order.

Thus, since the number of times it is determined that the parameter value of each determination item does not satisfy the condition is totaled and the determination of a determination item more likely to be determined not to satisfy the condition on the basis of a total result is preferentially executed with respect to each of the terminal 10 side and the server 30 side, a time required for specifying of a possibility that the quality of service cannot be guaranteed and specifying of a cause of a case in which the quality of service cannot be guaranteed is shortened.

Figure 12:
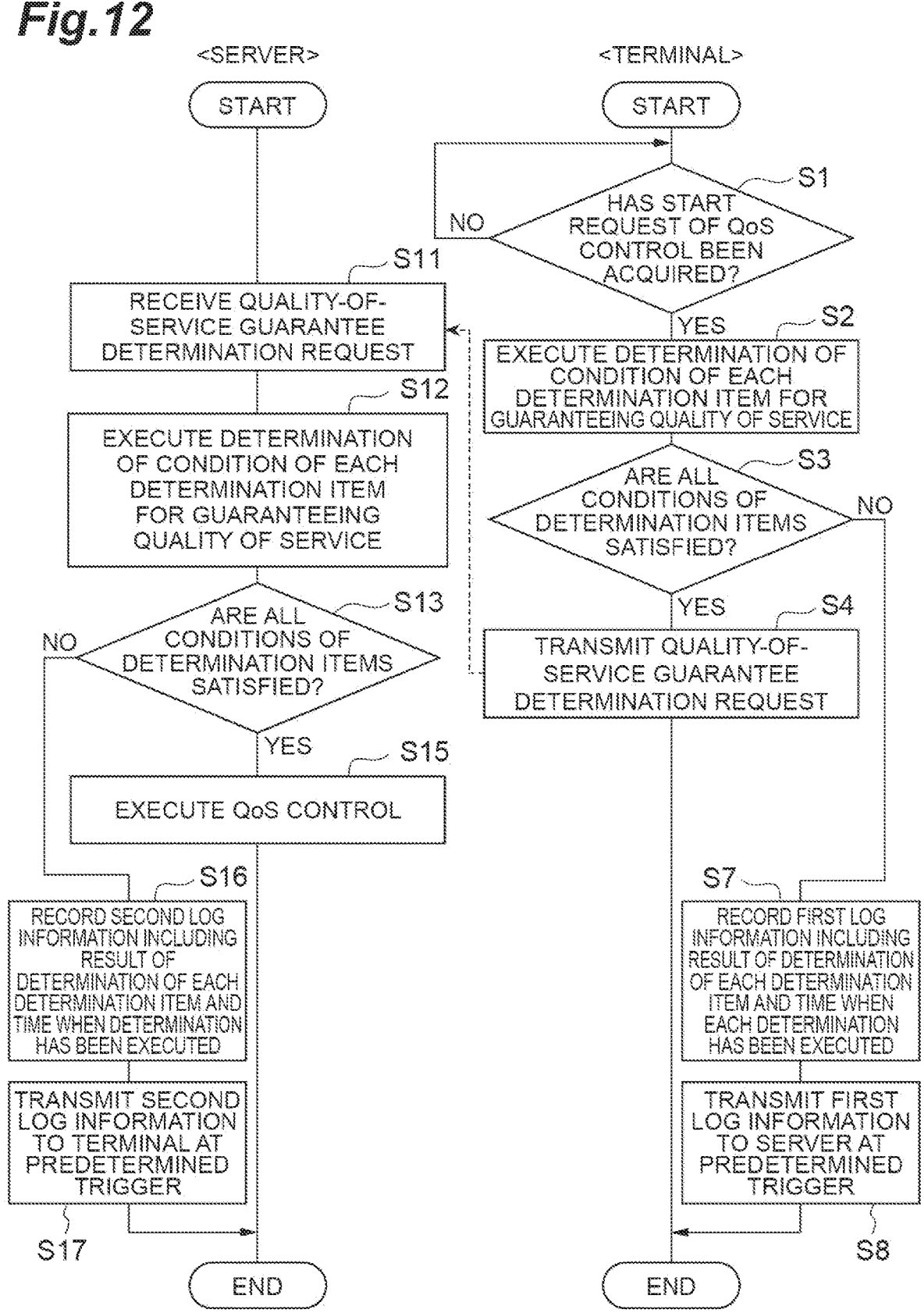
FIG. 12 is a flowchart illustrating the processing content of a quality-of-service management method in the quality-of-service management system.

FIG. 12 is a flowchart illustrating a first example of the processing content of the quality-of-service management method in the quality-of-service management system 1.

In step S1, the first acquisition unit 11 determines whether or not the start request of QoS control from the application AP or the terminal 10 has been acquired. When it is determined that the start request of QoS control has been acquired, the processing proceeds to step S2. On the other hand, when it is not determined that the start request of QoS control has been acquired, the processing of step S1 is repeated.

In step S2, the first determination unit 12 executes a determination of conditions regarding the terminal-side determination items for guaranteeing the predetermined quality of service regarding communication. In next step S3, the first determination unit 12 determines that the predetermined quality of service can be guaranteed since each parameter of all of the terminal-side determination items that are determination targets does not correspond to the condition for determining that the predetermined quality of service cannot be guaranteed. When it is determined that the predetermined quality of service can be guaranteed, the processing proceeds to step S4. On the other hand, when it is not determined that the predetermined quality of service can be guaranteed, the processing proceeds to step S7.

In step S4, the request unit 13 transmits the quality-of-service guarantee determination request to the server 30. In step S11, the second acquisition unit 31 of the server 30 receives the quality-of-service guarantee determination request.

In step S12, the second determination unit 32 executes a determination of the condition regarding the server-side determination item for guaranteeing the predetermined quality of service regarding communication. In step S13, the second determination unit 32 determines that the predetermined quality of service can be guaranteed since the parameter of each of the server-side determination items that are determination targets does not correspond the condition for determining that the predetermined quality of service cannot be guaranteed. When it is determined that the predetermined quality of service can be guaranteed, the processing proceeds to step S15. On the other hand, when it is not determined that the predetermined quality of service can be guaranteed, the processing proceeds to step S16.

In step S15, the second control unit 36 of the server 30 executes the QoS control for the application AP of the terminal 10 or the terminal 10. Further, the second control unit 36 notifies the terminal 10 that the QoS control is executed. When the terminal 10 that has received this notification sets the application AP as the QoS control target, the terminal 10 may notify the application AP that the QoS control is executed. Further, the notification unit 33 may notify the terminal 10 of the guarantee determination information including the determination result for the server-side determination item in the second determination unit 32 prior to the execution of the QoS control.

When it is not determined in step S3 that the predetermined quality of service can be guaranteed, the first recording unit 14 records the first log information including the result of the determination regarding each terminal-side determination item in the first determination unit 12 and the time when each determination has been executed in step S7.

In step S8, the first log transmission unit 15 transmits the first log information recorded by the first recording unit 14 to the server 30 at a predetermined trigger. Processing of steps S7 and S8 is not limited to the case in which it is not determined in step S3 that the predetermined quality of service can be guaranteed, and may be executed when it is determined that the predetermined quality of service can be guaranteed.

When it is not determined in step S13 that the predetermined quality of service can be guaranteed, the second recording unit 34 records the second log information including the result of the determination regarding each server-side determination item in the second determination unit 32 and the time when each of the determinations has been executed in step S16.

In step S17, the second log transmission unit 35 transmits the second log information recorded by the second recording unit 34 to the terminal 10 at a predetermined trigger. The processing of step S16 and step S17 is not limited to the case in which it is not determined in step S13 that the predetermined quality of service can be guaranteed, and can be executed in a case in which it is determined that the predetermined quality of service can be guaranteed.

Further, when it is not determined in step S13 that the predetermined quality of service can be guaranteed, the notification unit 33 may notify the terminal 10 of the guarantee determination information indicating that the predetermined quality of service cannot be guaranteed, as the result of the determination of the server-side determination item in the second determination unit 32.

Figure 13:
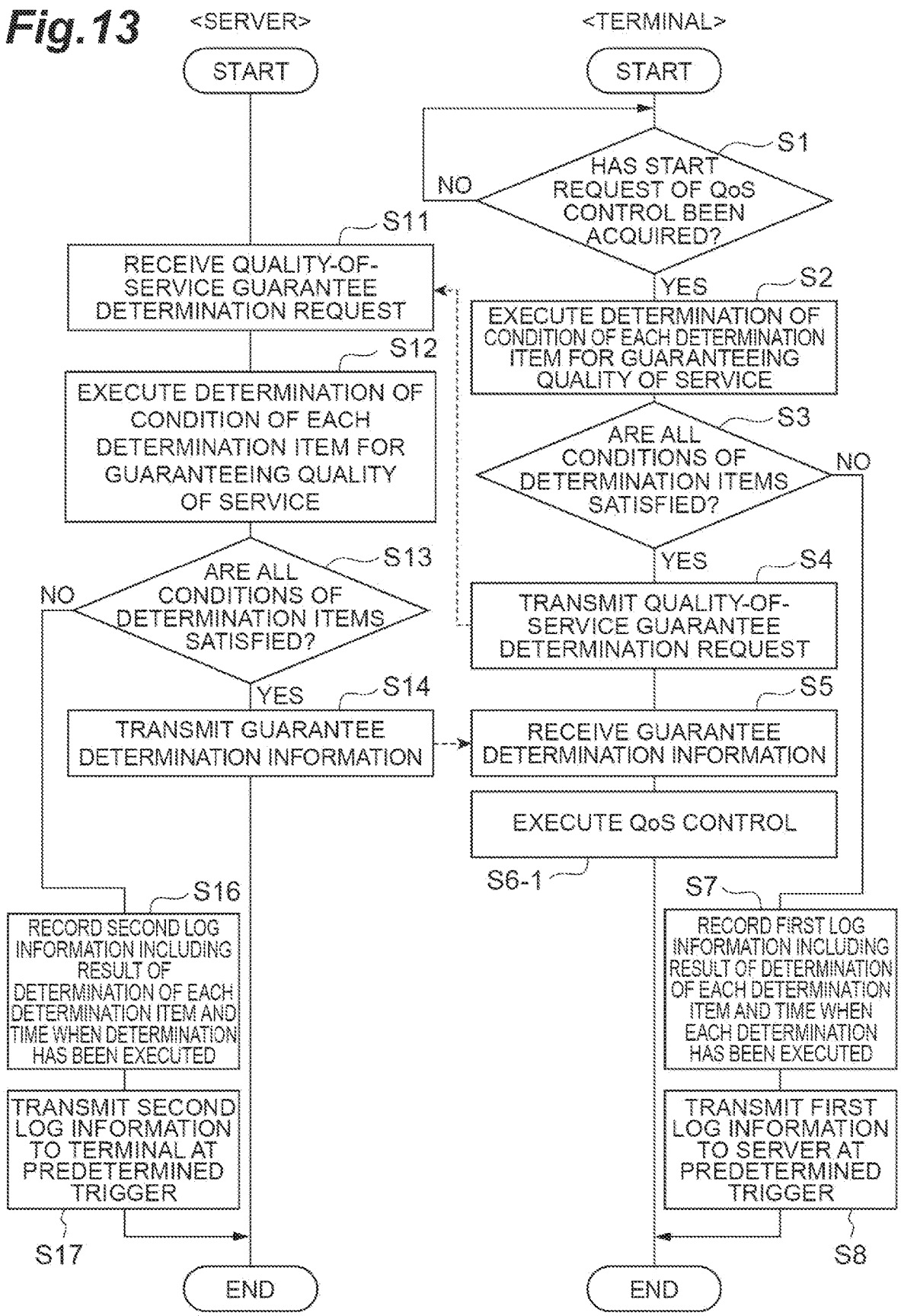
FIG. 13 is a flowchart illustrating the processing content of the quality-of-service management method in the quality-of-service management system.

FIG. 13 is a flowchart illustrating a second example of the processing content of the quality-of-service management method in the quality-of-service management system 1. Since processing content of steps S1 to S4 and steps S11 to S13 in the flowchart of FIG. 13 is the same as the processing content of the same steps in the flowchart of FIG. 12, description thereof will be omitted.

When it is determined in step S13 that the predetermined quality of service can be guaranteed, the notification unit 33 notifies the terminal 10 of the guarantee determination information including the determination result for the server-side determination item in the second determination unit 32 in step S14.

In step S5, the first control unit 16 receives, from the server 30, the guarantee determination information indicating that the predetermined quality of service can be guaranteed for the server-side determination item. In step S6-1, the first control unit 16 executes QoS control for the application AP. In this case, the first control unit 16 may notify the application AP of the execution of the QOS control. Further, the first control unit 16 may notify the server 30 that the QOS control is executed.

Since processing content of steps S7 to S8 and steps S16 to S17 in the flowchart of FIG. 13 is the same as the processing content of the same steps in the flowchart of FIG. 12, description thereof will be omitted. When it is not determined in step S13 that the predetermined quality of service can be guaranteed, the notification unit 33 may notify the terminal 10 of the guarantee determination information indicating the predetermined quality of service cannot be guaranteed, as the result of the determination of the server-side determination item in the second determination unit 32.

Figure 14:
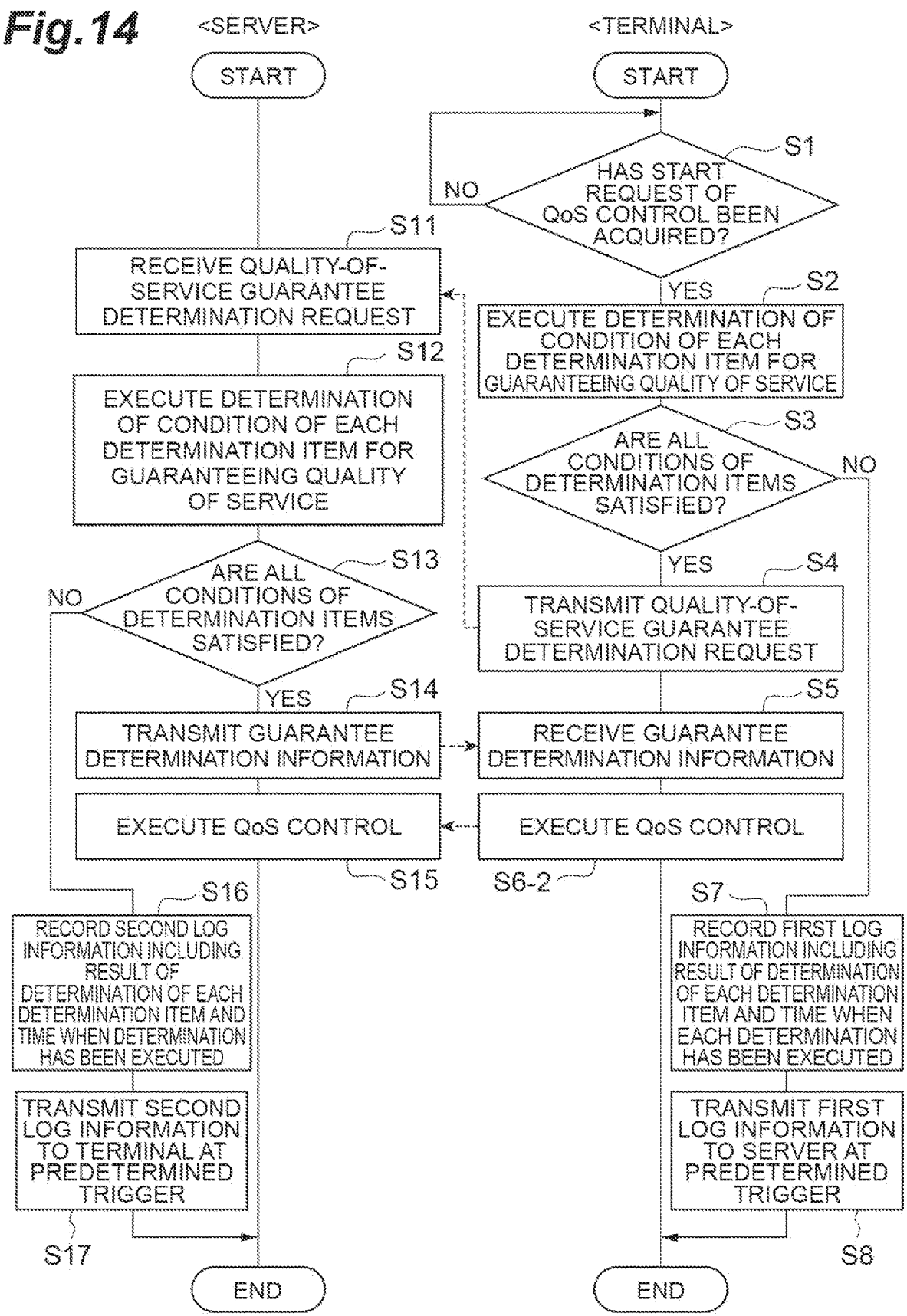
FIG. 14 is a flowchart illustrating the processing content of the quality-of-service management method in the quality-of-service management system.

FIG. 14 is a flowchart illustrating a third example of the processing content of the quality-of-service management method in the quality-of-service management system 1. Since processing content of steps S1 to S4 and steps S11 to S13 in the flowchart of FIG. 14 are the same as the processing content of the same steps in the flowchart of FIG. 12, description thereof will be omitted.

When it is determined in step S13 that the predetermined quality of service can be guaranteed, the notification unit 33 notifies the terminal 10 of the guarantee determination information including the determination result for the server-side determination item in the second determination unit 32 in step S14. In step S5, the first control unit 16 receives from the server 30 the guarantee determination information indicating that the predetermined quality of service can be guaranteed for the server-side determination item.

In step S6-2, the first control unit 16 transmits a request for execution of the QoS control to the server 30. In step S15, the second control unit 36 executes QoS control for the application AP of the terminal 10 or the terminal 10. The second control unit 36 notifies the terminal 10 that the QoS control is executed. The terminal 10 that has received this notification may notify the application AP that the QoS control is executed when the application AP is set as the QoS control target.

Figure 15:
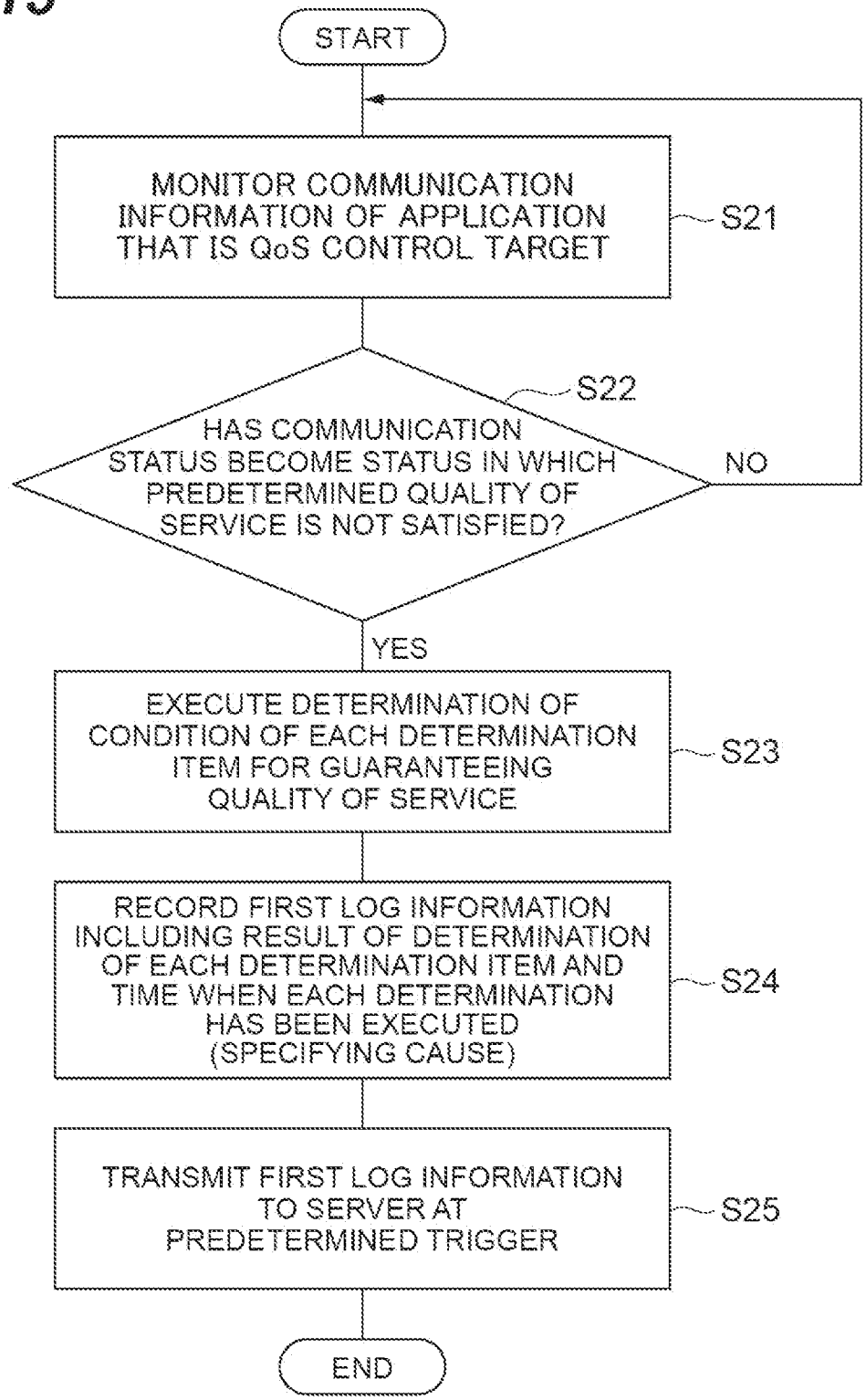
FIG. 15 is a flowchart illustrating the processing content of the quality-of-service management method after start of QoS control in the terminal.

Next, processing content of the quality-of-service management method after start of QoS control will be described. FIG. 15 is a flowchart illustrating the processing content of the quality-of-service management method after start of QoS control in the terminal.

In step S21, the first monitoring unit 17 monitors the communication information indicating the communication status of the application AP or the terminal 10 that is the QoS control target.

In step S22, the first monitoring unit 17 judges whether or not the communication status shown in the communication information has become a status in which the predetermined quality of service is not satisfied. When it is judged that the communication status has become the status in which the predetermined quality of service is not satisfied, the processing proceeds to step S23. On the other hand, when it is not judged that the communication status has become the status in which the predetermined quality of service is not satisfied, the processing returns to step S21.

In step S23, the first determination unit 12 executes a determination of the conditions regarding the terminal-side determination items for guaranteeing the predetermined quality of service regarding communication. Here, the first determination unit 12 may execute the determination regarding all the terminal-side determination items or may execute the determination regarding some of the terminal-side determination items. Further, the first determination unit 12 may execute a determination regarding a dynamically changed terminal-side determination item.

In step S24, the first recording unit 14 records the first log information including the result of the processing regarding each terminal-side determination item in the first determination unit 12. This makes it possible to specify a cause of a case in which the communication status is a status in which the predetermined quality of service is not satisfied.

In step S25, the first log transmission unit 15 transmits the first log information recorded by the first recording unit 14 to the server 30 at a predetermined trigger.

Figure 16:
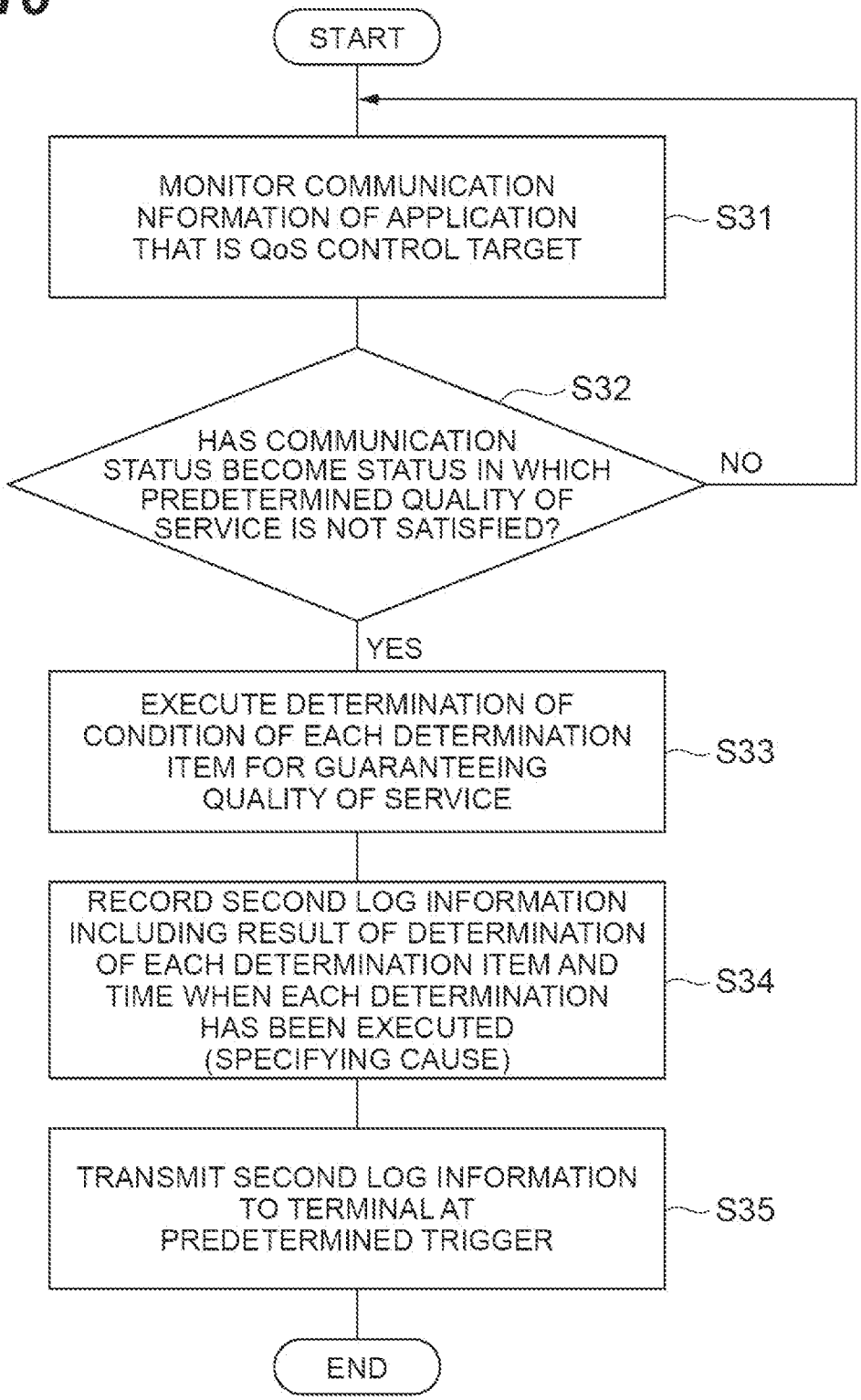
FIG. 16 is a flowchart illustrating the processing content of the quality-of-service management method after start of QoS control in the server.

FIG. 16 is a flowchart illustrating processing content of the quality-of-service management method after start of QoS control in the server 30.

In step S31, the second monitoring unit 37 monitors the communication information indicating the communication status of the application AP or the terminal 10 that is the QoS control target.

In step S32, the second monitoring unit 37 judges whether or not the communication status shown in the communication information has become a status in which the predetermined quality of service is not satisfied. When it is judged that the communication status has become the status in which the predetermined quality of service is not satisfied, the processing proceeds to step S33. On the other hand, when it is not judged that the communication status has become the status in which the predetermined quality of service is not satisfied, the processing returns to step S31.

In step S33, the second determination unit 32 executes a determination of the condition regarding the server-side determination item for guaranteeing the predetermined quality of service regarding communication. Here, the second determination unit 32 may execute the determination regarding all the server-side determination items or may execute the determination regarding some of the server-side determination items. Further, the second determination unit 32 may execute the determination regarding the dynamically changed server-side determination item.

In step S34, the second recording unit 34 records the second log information including the result of the processing regarding each server-side determination item in the second determination unit 32. This makes it possible to specify a cause of a case in which the communication status is a status in which the predetermined quality of service is not satisfied.

In step S35, the second log transmission unit 35 transmits the second log information recorded by the second recording unit 34 to the terminal 10 at a predetermined trigger.

FIG. 17 is a diagram illustrating an example of determination results for determination items on the terminal 10 side and the server 30 side after start of QoS control. The example illustrated in FIG. 17 includes the first log information recorded in step S24 and the second log information recorded in step S34.

In the example illustrated in FIG. 17, since an acquired parameter value is "95%" for a "CPU usage rate" that is the terminal-side determination item among five determination items and corresponds to "90% or more" that is the condition for determining that the predetermined quality of service cannot be guaranteed, the first determination unit 12 can specify that the cause of the case in which the predetermined quality of service cannot be guaranteed is the "CPU usage rate".

Figure 18:
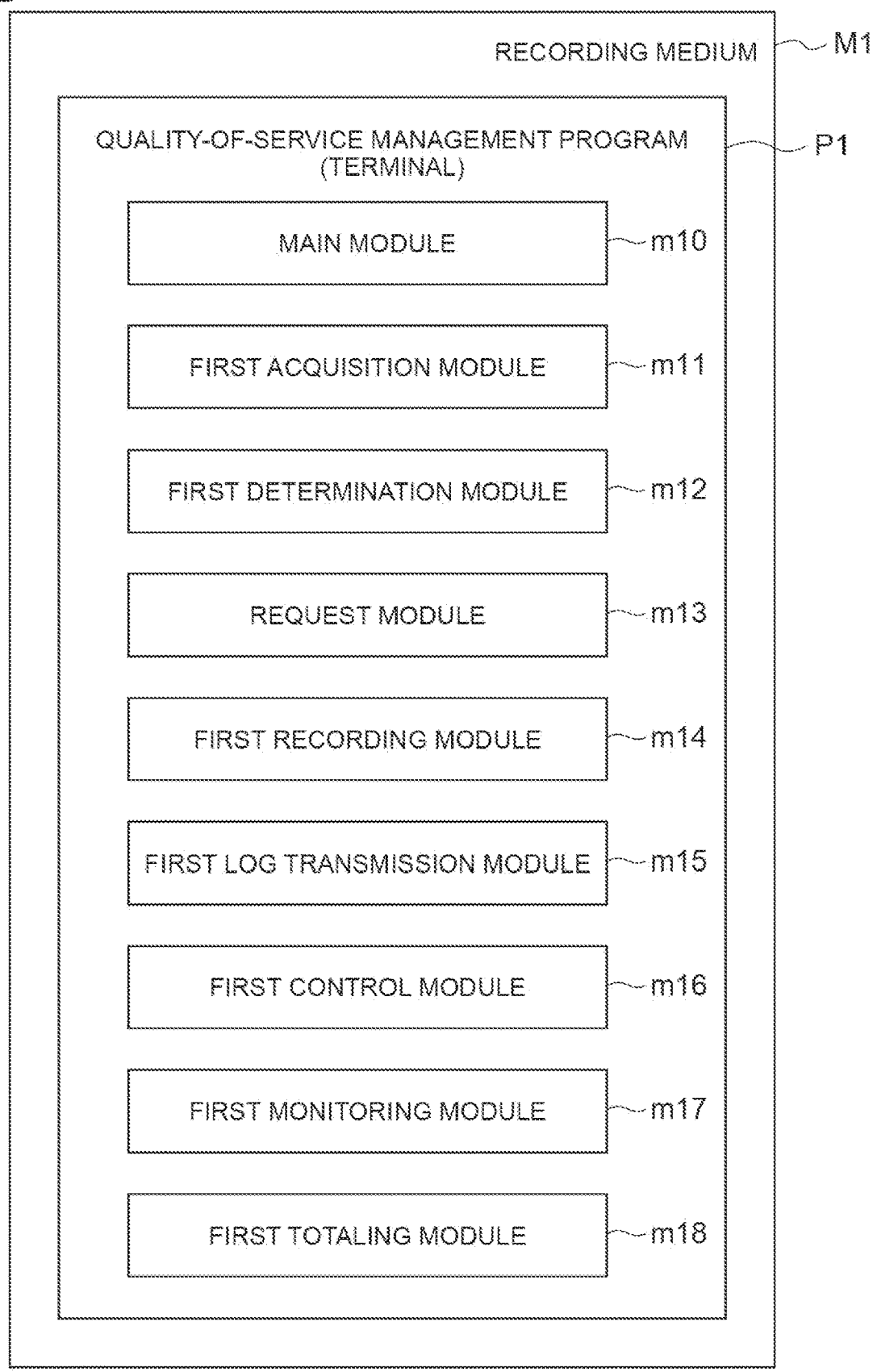
FIG. 18 is a diagram illustrating a configuration of a quality-of-service management program in a terminal.

Next, a quality-of-service management program for causing a computer to function as the terminal 10 and the server 30 as the quality-of-service management device of the present embodiment will be described. FIG. 18 is a diagram illustrating a configuration of the quality-of-service management program for the terminal 10.

A quality-of-service management program P1 includes a main module m10, a first acquisition module m11, a first determination module m12, a request module m13, a first recording module m14, a first log transmission module m15, a first control module m16, a first monitoring module m17, and a first totaling module m18 that comprehensively control quality-of-service management processing in the terminal 10. Respective functions for the first acquisition unit 11, the first determination unit 12, the request unit 13, the first recording unit 14, the first log transmission unit 15, the first control unit 16, the first monitoring unit 17, and the first totaling unit 18 are realized by the respective modules m11 to m18.

The quality-of-service management program P1 may be an aspect that is transmitted via a transmission medium such as a communication line, or may be an aspect that is stored in a recording medium M1 as illustrated in FIG. 18.

Figure 19:
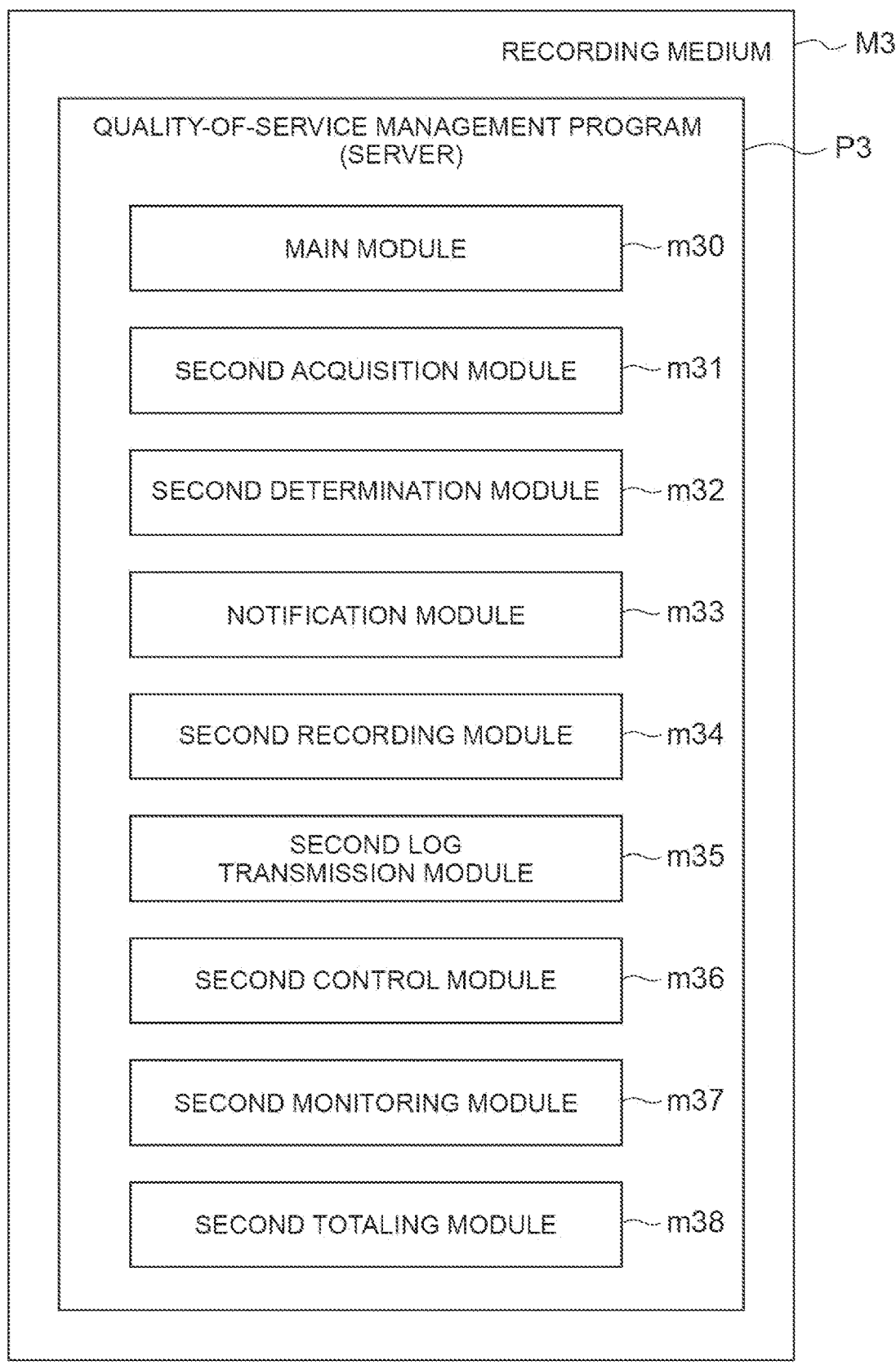
FIG. 19 is a diagram illustrating a configuration of a quality-of-service management program in a server.

Further, FIG. 19 is a diagram illustrating a configuration of a quality-of-service management program for the server 30.

A quality-of-service management program P3 includes a main module m30, a second acquisition module m31, a second determination module m32, a notification module m33, a second recording module m34, a second log transmission module m35, a second control module m36, a second monitoring module m37, and a second totaling module m38 that collectively control quality-of-service management processing in the server 30. Respective functions for the second acquisition unit 31, the second determination unit 32, the notification unit 33, the second recording unit 34, the second log transmission unit 35, the second control unit 36, the second monitoring unit 37, and the second totaling unit 38 are realized by the respective modules m31 to m38.

The quality-of-service management program P3 may be an aspect that is transmitted via a transmission medium such as a communication line, or may be an aspect that is stored in a recording medium M3, as illustrated in FIG. 19.

In the above description, some terminal-side determination items and server-side determination items are illustrated in FIGS. 6, 7, 10 and 17, but the determination items are not limited to these examples. Hereinafter, examples of terminal-side determination items and parameters of the determination items are additionally illustrated. The terminal-side determination items illustrated hereinafter may be determined on the server side or may be determined on both the terminal side and the server side. Further, the parameter of each determination item may be acquired from the inside of the terminal 10 or the inside of the server 30 or may be acquired as a response to an inquiry to the outside.

Communication setting for the mobile terminal
    Parameters: Mobile data communication setting, in-airplane mode setting, Wi-Fi mode setting, tethering setting, APN, carrier of communication destination, and type of carrier of communication destination (type of MNO or MVNO)

Hardware/software specification and status of the mobile terminal
    Parameters: Device name, operation of communication function, operation status of terminal 10, type and version of OS, and status of OS Resource status in the mobile terminal
    Parameters: CPU usage rate, RAM and ROM usage rate, and flips per second (FPS) of application Status of the QoS control target application
    Parameters: Problem of the QoS control target application, operation of the QoS control target application (for example, whether in which of a foreground and a background the application is operating), communication restrictions of QoS control target application, status of authentication of QoS control target application, QoS use permission status (for example, whether an application is permitted to use QoS in the quality-of-service management system or whether an application is permitted to use QoS by an operator of the quality-of-service management system), validity of a QoS request method (for example, whether an argument of a QoS request IF (interface) defined by the quality-of-service management system is set appropriately, or whether an argument of a QoS request IF defined by an operator of the service quality management system or the like is set appropriately?)

Operating status of a plurality of applications operating in the same terminal
    Parameters: Required specification and operating status of another application that requires QoS control, and operating status and communication status of another application that does not require the QoS control Place in which the terminal 10 exists
    Parameters: Presence or absence in base station area in which QoS control can be executed, presence or absence of surrounding obstacle, and radio wave status according to weather condition Communication contract status
    Parameters: whether or not a contract is a contract in which QoS control can be executed, or communication restrictions on contract Ascertaining of identity of an end user
    Parameter: identity of end user Hereinafter, examples of the server-side determination items and parameters of the determination items will be additionally illustrated. The server-side determination items illustrated hereinafter may be determined on the terminal side or may be determined on both the server side and the terminal side. Further, the parameter of each determination item may be acquired from the inside of the terminal 10 or the inside of the server 30 or may be acquired as a response to an inquiry to the outside.

Specification and status of hardware/software of terminal
    Parameters: Device name, operation of communication function, operation status of terminal, type and version of OS, and status of OS Communication contract status
    Parameters: whether or not a contract is a contract in which QoS control can be executed, or communication restrictions on contract Ascertaining of identity of end user
    Parameter: identity of end user Status of other-party terminal that communicates with own terminal
    Parameters: Whether the other-party terminal that communicates with the own terminal can be SLA-guaranteed, and whether the other-party terminal that communicates with the own terminal has a function as a quality-of-service management device Communication of malicious application Parameters: legitimacy of communication Whether or not application is QoS control target Parameters: Whether or not an application requesting QoS control is a QoS control target Presence or absence of QoS control target of access destination URL Parameter: Whether or not an access destination URL of an application requesting the QoS control is a QoS control target Time, period or area for QoS control target Parameters: Whether or not a time period is a time period in which QoS control can be executed, whether or not a time is in a period when QoS control can be executed, or whether or not an area is an area in which QoS control can be executed.

Number of mobile terminals that simultaneously access the same base station, the number of access applications, or traffic volume Number of mobile terminals that simultaneously access a network device such as the same base station and core network device, the number of access applications, or traffic volume Parameters: Remaining number of mobile terminals that can access the network device, and remaining accessible traffic volume Status of a communication device such as a base station Parameters: Status of a communication device such as a base station when a special situation such as a failure of the communication device, or a disaster has occurred.

Status of the application server

Parameters: Failure of an application server

Delay information of a place in which the mobile terminal exists

Parameter: Delay guarantee value

In the quality-of-service management system 1, the quality-of-service management method, and the quality-of-service management programs P1 and P3 of the embodiments described above, first, the terminal 10 determines whether or not the parameter regarding the QoS control for the application AP or the terminal satisfies the predetermined satisfaction condition, the server 30 determines whether or not the parameter satisfies the predetermined satisfaction condition when the terminal 10 determines that the parameter satisfies the satisfaction condition, and QoS control is started when the server 30 determines that the parameter satisfies the satisfaction condition. Therefore, since the QoS control is not executed when there is a factor of a case in which the quality of service cannot be guaranteed or a factor of a case in which QoS control cannot be executed, it is possible to provide appropriate QoS control. Further, since the server 30 determines whether or not the parameter satisfies the predetermined satisfaction condition only when the terminal 10 determines that the parameter satisfies the predetermined satisfaction condition, unnecessary determination processing is prevented from being executed in the server 30 when the satisfaction condition is not satisfied on the terminal 10 side. Further, since it is determined whether or not the parameter satisfies the condition in each of the terminal and the server 30, it is possible to specify a cause of a case in which the condition is not satisfied. Further, it is possible to prevent a denial of service attack (DOS) attack from an unauthorized application.

Further, in the quality-of-service management system according to another embodiment, the quality-of-service management device may further include a control unit configured to start the QoS control for the application or the terminal when the second determination unit determines that the parameter value of each quality-of-service management device-side determination item satisfies the corresponding satisfaction condition.

According to the above embodiment, since the QoS control is started when it is determined that the parameter value of the quality-of-service management device-side determination item satisfies the satisfaction condition, the QoS control is not executed when there is a factor of a case in which the quality of service cannot be guaranteed or a factor of a case in which QoS control cannot be executed. Therefore, it is possible to provide appropriate QoS control.

Further, in the quality-of-service management system according to another embodiment, the terminal may further include: a first recording unit configured to record first log information including a result of processing regarding each terminal-side determination item in the first determination unit, and a first log transmission unit configured to transmit the first log information recorded by the first recording unit to the quality-of-service management device at a predetermined trigger.

According to the above embodiment, since the log information including the result of the processing regarding each terminal-side determination item is recorded in the terminal, it becomes possible to specify a cause of a case in which it is determined that the quality of service cannot be guaranteed or the QoS control cannot be executed. Further, since the log information is transmitted to the quality-of-service management device, sharing of information on a cause of a case in which the quality of service cannot be guaranteed or the QoS control cannot be executed between the terminal and the quality-of-service management device is realized.

Further, in the quality-of-service management system according to another embodiment, the first recording unit records a determination time required for the determination of each terminal-side determination item in the first determination unit, the determination time being included in the first log information, and the first determination unit executes the determinations of the terminal-side determination items in ascending order of the determination times at the time of the determination of the terminal-side determination items in which a determination history is recorded as the first log information.

According to the above embodiment, since the determinations of the terminal-side determination items are executed in an ascending order of the determination times of the respective terminal-side determination items, a time required for specifying of a cause of a case in which the quality of service cannot be guaranteed or the QoS control cannot be executed is shortened.

Further, in the quality-of-service management system according to another embodiment, the terminal may further include a first totaling unit configured to statistically total, for each terminal-side determination item, the number of times it is determined that the parameter value of the terminal-side determination item does not satisfy the satisfaction condition on the basis of the first log information, and the first determination unit may execute a determination of the terminal-side determination item highly likely to be determined not to satisfy the condition preferentially in a frequency or order on the basis of the result of statistical totaling in the first totaling unit.

According to the above embodiment, since the number of times it is determined that the parameter value of each determination item does not satisfy the condition is totaled and the determination of the determination item highly likely to be determined not to satisfy the condition on the basis of a total result is preferentially executed on the terminal side, a time required for specifying of a possibility that the quality of service cannot be guaranteed or the QoS control cannot be executed and specifying of a cause of a case in which the quality of service cannot be guaranteed or the QoS control cannot be executed is shortened.

Further, in the quality-of-service management system according to another embodiment, the quality-of-service management device may further include: a second recording unit configured to record second log information including a result of processing regarding each quality-of-service management device-side determination item in the second determination unit, and a second log transmission unit configured to transmit the second log information recorded by the second recording unit to the terminal at a predetermined trigger.

According to the above embodiment, since the log information including the result of the processing regarding each quality-of-service management device-side determination item is recorded in the quality-of-service management device, it becomes possible to specify a cause of a case in which it is determined that the quality of service cannot be guaranteed or the QoS control cannot be executed. Further, since the log information is transmitted to the terminal, sharing of information on a cause of a case in which the quality of service cannot be guaranteed or the QoS control cannot be executed between the terminal and the quality-of-service management device is realized.

Further, in the quality-of-service management system according to another embodiment, the second recording unit may record a determination time required for the determination of each quality-of-service management device-side determination item in the second determination unit, the determination time being included in the second log information, and the second determination unit may execute determinations of the quality-of-service management device-side determination items in an ascending order of determination times at the time of the determination of the quality-of-service management device-side determination items in which a determination history is recorded as the second log information.

According to the above embodiment, since the determinations of the quality-of-service management device-side determination items are executed in an ascending order of the determination times of the respective quality-of-service management device-side determination items, a time required for specifying of a cause of a case in which the quality of service cannot be guaranteed or the QoS control cannot be executed is shortened.

Further, in the quality-of-service management system according to another embodiment, the quality-of-service management device may further include a second totaling unit configured to statistically total, for each the quality-of-service management device-side determination item, the number of times it is determined that the parameter value of the quality-of-service management device-side determination item does not satisfy the condition on the basis of the second log information, and the second determination unit may execute a determination of the quality-of-service management device-side determination item highly likely to be determined not to satisfy the condition, preferentially in a frequency or order, on the basis of a result of the statistical totaling in the totaling unit.

According to the above embodiment, since the number of times it is determined that the parameter value of each determination item does not satisfy the condition is totaled and the determination of the determination item highly likely to be determined not to satisfy the condition on the basis of a total result is preferentially executed on the server side, a time required for specifying of a possibility that the quality of service cannot be guaranteed or the QoS control cannot be executed and specifying of a cause of a case in which the quality of service cannot be guaranteed or the QoS control cannot be executed is shortened.

Further, in the quality-of-service management system according to another embodiment, the terminal may further include a first monitoring unit configured to monitor communication information indicating the communication status of the application or the terminal serving as a QoS control target, and the first determination unit may execute a determination regarding the terminal-side determination item when the communication status shown in the communication information becomes a status in which predetermined quality of service is not satisfied during the execution of the QoS control.

According to the above embodiment, since the determination regarding each terminal-side determination item is executed when the communication status of the application or the terminal is monitored and the communication status becomes a status in which the quality of service is not satisfied, it becomes possible to specify a cause of a case in which the quality of service cannot be guaranteed or the control QoS cannot be executed due to an event that has occurred on the terminal side.

Further, in the quality-of-service management system according to another embodiment, the quality-of-service management device may further include a second monitoring unit configured to monitor communication information indicating the communication status of the application or the terminal serving as a QoS control target, and the second determination unit executes a determination regarding the quality-of-service management device-side determination item when the communication status shown in the communication information becomes a status in which the predetermined quality of service is not satisfied during the execution of the QoS control.

According to the above embodiment, since the determination regarding each server-side determination item is executed when the communication status of the application or the terminal is monitored and the communication status becomes a status in which the quality of service is not satisfied, it becomes possible to specify a cause of a case in which the quality of service cannot be guaranteed or the control QoS cannot be executed due to an event that has occurred on the server side.

Further, in the quality-of-service management system according to another embodiment, the request unit may transmit the position information indicating the position of the terminal to the quality-of-service management device together with the condition determination request for starting QoS control, one or more quality-of-service management device-side determination items may include a quality-of-service management device-side determination item in which the position information of the terminal is referred to and it is determined whether or not the corresponding condition is satisfied, and the second determination unit may execute the determination regarding the quality-of-service management device-side determination item by referring to the position information of the terminal.

According to the above embodiment, since the position information of the terminal is transmitted to the quality-of-service management device, it is possible to execute the determination of the determination item related to the position of the terminal.

Further, in the quality-of-service management system according to another embodiment, the second determination unit may request the other-party terminal to execute a determination as to whether or not the predetermined quality of service regarding communication can be guaranteed and to return determination result information indicating a result of the determination when the application requests communication based on a peer to peer (P2P) scheme between the terminal and the other-party terminal different from the terminal, and execute the determination regarding the server-side determination item when the determination result information indicating that the predetermined quality of service can be guaranteed is returned.

According to the above embodiment, when the application that is the QoS control target requests communication based on the P2P scheme and it is determined that the predetermined quality of service can be guaranteed in the other-party terminal, it is determined in the server whether or not quality of service can be guaranteed, and the QoS control is executed when it is determined that the quality of service can be guaranteed, making it possible to provide an appropriate QoS control in consideration of the status of the other-party terminal.

Although the present embodiment has been described in detail above, it is apparent to those skilled in the art that the present embodiment is not limited to the embodiments described in the present specification. The present embodiment can be implemented as a modified and changed aspect without departing from the spirit and scope of the present invention defined by the description of the claims. Accordingly, the description of the present specification is intended for the purpose of illustration and does not have any restrictive meaning with respect to the present embodiments.

Each aspect or embodiment described in the present specification may be applied to long term evolution (LTE), LTE-Advanced (LTE-A), SUPER 3G, IMT-Advanced, 4G, 5G, future radio access (FRA), W-CDMA (registered trademark), GSM (registered trademark), CDMA2000, ultra mobile broad-band (UMB), IEEE 802.11 (Wi-Fi), IEEE 802.16 (WiMAX), IEEE 802.20, Ultra-Wide Band (UWB), Bluetooth (registered trademark), another system using an appropriate system, and/or a next generation system extended on the basis of these.

The processing procedure, sequence, flowchart, and the like in each aspect/embodiment described in the present specification may be in a different order unless inconsistency arises. For example, for the method described in the present specification, elements of various steps are presented in an exemplary order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A judgement may be performed using a value (0 or 1) represented by one bit, may be performed using a Boolean value (true or false), or may be performed through a numerical value comparison (for example, comparison with a predetermined value).

Each aspect/embodiment described in the present specification may be used alone, may be used in combination, or may be used by being switched according to execution. Further, a notification of predetermined information (for example, a notification of "being X") is not limited to being made explicitly, and may be made implicitly (for example, a notification of the predetermined information is not made).

Although the present disclosure has been described above in detail, it is obvious to those skilled in the art that the present disclosure is not limited to the embodiments described in the present disclosure. The present disclosure can be implemented as modified and changed aspects without departing from the spirit and scope of the present disclosure defined by the description of the claims. Therefore, the description of the present disclosure is intended for exemplification, and does not have any restrictive meaning with respect to the present disclosure.

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless of whether the software may be called software, firmware, middleware, microcode, or hardware description language or called other names.

Further, the application AP in the present disclosure is configured as software. That is, the application AP may be configured of one or more of an instruction, an instruction set, a code, a code segment, a program code, a program, a sub-program, a software module, an application, a software application, a software package, a routine, a sub-routine, an object, an executable file, a thread of execution, a procedure, a function, and the like.

Further, software, instructions, and the like may be transmitted and received via a transmission medium. For example, when software is transmitted from a website, a server, or another remote source using a wired technology such as a coaxial cable, an optical fiber cable, a twisted pair, or a digital subscriber line (DSL) and/or a wireless technology such as infrared rays, radios, or microwaves, the wired technology and/or the wireless technology is included in the definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or any combination of these.

The terms described in the present disclosure and/or terms necessary for understanding of the present specification may be replaced by terms having the same or similar meanings.

The terms "system" and "network" used in the present specification are used interchangeably.

Further, information, parameters, and the like described in the present specification may be represented by an absolute value, may be represented by a relative value from a predetermined value, or may be represented by corresponding different information.

The term "determining" used in the present disclosure may include a variety of operations. The "determining" can include, for example, regarding judging, calculating, computing, processing, deriving, investigating, searching (looking up, search, or inquiry) (for example, searching in a table, a database, or another data structure), or ascertaining as "determining". Further, "determining" can include regarding receiving (for example, receiving information), transmitting (for example, transmitting information), inputting, outputting, or accessing (for example, accessing data in a memory) as "determining". Further, "determining" can include regarding resolving, selecting, choosing, establishing, comparing or the like as "determining". That is, "determining" can include regarding a certain operation as "determining". Further, "determination" may be read as "assuming", "expecting", "considering", or the like.

The description "based on" used in the present disclosure does not mean "based only on" unless otherwise noted. In other words, the description "based on" means both of "based only on" and "at least based on".

When the terms "first", "second", and the like are used in the present specification, any reference to elements thereof does not generally limit an amount or order of those elements. These terms can be used in the present specification as a convenient way to distinguish between two or more elements. Thus, the reference to the first and second elements does not mean that only two elements can be adopted or that the first element has to precede the second element in some way.

When "include", "including" and modifications thereof are used in the present specification or claims, those terms are intended to be comprehensive like the term "comprising". Further, the term "or" used in the present specification or claims is intended not to be an exclusive OR.

In the present specification, it is assumed that a plurality of devices are also included unless a single device is clearly indicated by the context or technically.

In the whole of the present disclosure, it is assumed that a plurality of things are included unless it is not cleared from the context that a singular thing is indicated.

REFERENCE SIGNS LIST

1 Quality-of-service management system
10 Terminal
11 First acquisition unit
12 First determination unit
13 Request unit
14 First recording unit
15 First log transmission unit
16 First control unit
17 First monitoring unit
18 First totaling unit
19 Terminal-side determination item storage unit
20 First log information storage unit
30 Server
31 Second acquisition unit
32 Second determination unit
33 Notification unit
34 Second recording unit
35 Second log transmission unit
36 Second control unit
37 Second monitoring unit
38 Second totaling unit
38 Server-side determination item storage unit
39 Second log information storage unit
m10 Main module
m11 First acquisition module
m12 First determination module
m13 Request module
m14 First recording module
m15 First log transmission module
m16 First control module
m17 First monitoring module
m18 First totaling module
m30 Main module
m31 Second acquisition module
m32 Second determination module
m33 Notification module
m34 Second recording module
m35 Second log transmission module
m36 Second control module
m37 Second monitoring module
m38 Second totaling module
M1, M3 Recording medium
P1, P3 Quality-of-service management program.

The invention claimed is:

1. A quality-of-service management system comprising a terminal configured to execute an application, and a quality-of-service management device configured to provide QoS control regarding quality of service of communication,
wherein the terminal comprises circuitry configured to:
acquire a parameter value corresponding to each of terminal-side determination items and determine whether or not the parameter value satisfies a satisfaction condition, with respect to at least one terminal-side determination item defining the satisfaction condition to be satisfied for the parameter acquirable by the terminal, in response to a start request of QoS control from the application or the terminal;
control the quality-of-service management device to provide QoS control when the circuitry of the terminal determines that the satisfaction condition of the terminal-side determination item is satisfied;
record first log information including a result of processing regarding each terminal-side determination item in the circuitry of the terminal; and
transmit the first log information recorded by the circuitry of the terminal to the quality-of-service management device at a predetermined trigger,
wherein the terminal-side determination item is a place in which the terminal is located,
wherein the quality-of-service management device comprises circuitry configured to acquire a parameter value corresponding to each of quality-of-service management device-side determination items and determine whether or not the parameter value satisfies a satisfaction condition, with respect to at least one quality-of-service management device-side determination item defining the satisfaction condition to be satisfied for the parameter acquirable by the quality-of-service management device, in response to control of provision of the QoS control from the terminal, and
at least one of the terminal and the quality-of-service management device starts the QoS control targeting the application or the terminal when the circuitry of the quality-of-service management determines that the corresponding satisfaction condition of the quality-of-service management device-side determination item is satisfied.

2. The quality-of-service management system according to claim 1, wherein the circuitry of the quality-of-service management device is further configured to start the QoS control for the application or the terminal when the circuitry of the quality-of-service management device determines that the parameter value of each quality-of-service management device-side determination item satisfies the corresponding satisfaction condition.

3. The quality-of-service management system according to claim 1,
wherein the circuitry of the terminal records a determination time required for the determination of each terminal-side determination item in the circuitry of the terminal, the determination time being included in the first log information, and
the circuitry of the terminal executes the determinations of the terminal-side determination items in ascending order of the determination times at the time of the determination of the terminal-side determination items in which a determination history is recorded as the first log information.

4. The quality-of-service management system according to claim 1,
wherein the circuitry of the terminal is further configured to statistically total, for each terminal-side determination item, the number of times it is determined that the parameter value of the terminal-side determination item does not satisfy the satisfaction condition on the basis of the first log information, and
the circuitry of the terminal executes the determination of the terminal-side determination item highly likely to be determined not to satisfy the condition on the basis of a result of the statistical totaling in the circuitry of the terminal, preferentially in a frequency or order.

5. The quality-of-service management system according to claim 1,
wherein the circuitry of the quality-of-service management device is further configured to:
record second log information including a result of processing regarding each quality-of-service management device-side determination item in the circuitry of the quality-of-service management device, and
transmit the second log information recorded by the circuitry of the quality-of-service management device to the terminal at a predetermined trigger.

6. The quality-of-service management system according to claim 5,
wherein the circuitry of the quality-of-service management device records a determination time required for the determination of each quality-of-service management device-side determination item in the circuitry of the quality-of-service management device, the determination time being included in the second log information, and
the circuitry of the quality-of-service management device executes determinations of the quality-of-service management device-side determination items in an ascending order of determination times at the time of the determination of the quality-of-service management device-side determination items in which a determination history is recorded as the second log information.

7. The quality-of-service management system according to claim 5,
wherein the circuitry of the quality-of-service management device is further configured to statistically total, for each the quality-of-service management device-side determination item, the number of times it is determined that the parameter value of the quality-of-service management device-side determination item does not satisfy the satisfaction condition on the basis of the second log information, and
the circuitry of the quality-of-service management device executes a determination of the quality-of-service management device-side determination item highly likely to be determined not to satisfy the condition, preferentially in a frequency or order, on the basis of a result of the statistical totaling in the circuitry of the quality-of-service management device.

8. The quality-of-service management system according to claim 1,
wherein the circuitry of the terminal is further configured to monitor communication information indicating the communication status of the application or the terminal serving as a QoS control target, and
the circuitry of the terminal executes a determination regarding the terminal-side determination item when the communication status shown in the communication information becomes a status in which a predetermined quality of service is not satisfied during the execution of the QoS control.

9. The quality-of-service management system according to claim 1,
wherein the circuitry of the quality-of-service management device is further configured to monitor communication information indicating the communication status of the application or the terminal serving as a QoS control target, and
the circuitry of the quality-of-service management device executes a determination regarding the quality-of-service management device-side determination item when the communication status shown in the communication information becomes a status in which the predetermined quality of service is not satisfied during the execution of the QoS control.

10. The quality-of-service management system according to claim 1, wherein the parameter value corresponding to the terminal-side determination item is at least one of presence or absence in base station area in which QoS control can be executed, presence or absence of surrounding obstacle, and radio wave status according to weather condition.

11. The quality-of-service management system according to claim 1, wherein the terminal-side determination item is status of a QoS control target application.

12. The quality-of-service management system according to claim 1, wherein the terminal-side determination item is communication contract status, and wherein the parameter value corresponding to the terminal-side determination item is whether or not the contract is a contract in which QoS control can be executed, or communication restrictions on contract.

13. The quality-of-service management system according to claim 1, wherein the terminal-side determination item is specification and status of hardware/software of the terminal.

14. The quality-of-service management system according to claim 1, wherein the terminal-side determination item is whether or not application is QoS control target, and wherein the parameter value corresponding to the terminal-side determination item is whether or not an application requesting QoS control is a QoS control target.

15. The quality-of-service management system according to claim 1, wherein the terminal-side determination item is presence or absence of QoS control target of access destination URL and wherein the parameter value corresponding to the terminal-side determination item is whether or not the access destination URL of an application requesting the QoS control is a QoS control target.

16. The quality-of-service management system according to claim 1, wherein the terminal-side determination item is time, period or area for QoS control target.

17. The quality-of-service management system according to claim 1, wherein the quality-of-service management device-side determination item is a place in which the terminal is located.

18. The quality-of-service management system according to claim 17, wherein the parameter value corresponding to the quality-of-service management device-side determination item is at least one of presence or absence in base station area in which QoS control can be executed, presence or absence of surrounding obstacle, and radio wave status according to weather condition.

19. The quality-of-service management system according to claim 1, wherein the quality-of-service management device-side determination item is time, period or area for QoS control target.

20. The quality-of-service management system according to claim 1, wherein the quality-of-service management device-side determination item is communication contract status, and wherein the parameter value corresponding to the quality-of-service management device-side determination item is whether or not the contract is a contract in which QoS control can be executed, or communication restrictions on contract.

21. The quality-of-service management system according to claim 1, wherein the quality-of-service management device-side determination item is the number of mobile terminals that simultaneously access the same base station, the number of access applications, or traffic volume.

22. The quality-of-service management system according to claim 1, wherein the quality-of-service management device-side determination item is status of a communication device including a base station.

23. The quality-of-service management system according to claim 1, wherein the terminal comprises circuitry configured to transmit position information indicating the position of the terminal to the quality-of-service management device.

24. A terminal configured to be able to communicate with a quality-of-service management device configured to provide QoS control regarding quality of service of communication, an application as a QoS control target being executed in the terminal, the terminal comprising circuitry configured to:
acquire a parameter value corresponding to each of terminal-side determination items and determine whether or not the parameter value satisfies a satisfaction condition, with respect to at least one terminal-side determination item defining the satisfaction condition to be satisfied for the parameter acquirable by the terminal, in response to a start request of QoS control from the application;
control the quality-of-service management device to provide QoS control when the circuitry determines that the satisfaction condition of the terminal-side determination item is satisfied;
record first log information including a result of processing regarding each terminal-side determination item in the circuitry; and
transmit the first log information recorded by the circuitry to the quality-of-service management device at a predetermined trigger,
wherein the terminal-side determination item is a place in which the terminal is located.

25. A server configured to manage a status of QoS control regarding quality of service of communication and be able to communicate with a terminal, an application as a QoS control target being executed in the terminal, the server comprising circuitry configured to:
acquire a parameter value corresponding to each of quality-of-service management device-side determination items and determine whether or not the parameter value satisfies a satisfaction condition, with respect to at least one quality-of-service management device-side determination item in which a predetermined parameter that can be acquired by the server and a satisfaction condition to be satisfied for the parameter are defined in association with each other, in response to acquisition of a start request of QoS control from the terminal in the server,
wherein the server starts the QoS control for the application or the terminal when the circuitry determines that the parameter value of each quality-of-service management device-side determination item satisfies the corresponding satisfaction condition, or causes the terminal to execute the QoS control for the application by notifying the terminal of guarantee determination information including a determination result indicating that it is determined that the satisfaction condition is satisfied,
wherein the quality-of-service management device-side determination item is a place in which the terminal is located,
wherein the circuitry is further configured to:
record second log information including a result of processing regarding each quality-of-service management device-side determination item in the circuitry, and
transmit the second log information recorded by the circuitry to the terminal at a predetermined trigger.

26. The server according to claim 25, wherein the circuitry is further configured to:
start the QoS control for the application or the terminal when the circuitry determines that the parameter value of each quality-of-service management device-side determination item satisfies the corresponding satisfaction condition.

27. A non-transitory computer-readable recording medium storing a quality-of-service management program for causing a computer to function as a terminal configured to be able to communicate with a quality-of-service management device configured to provide QoS control regarding quality of service of communication, an application as a QoS control target being executed in the terminal, the quality-of-service management program causing the computer to realize:
a first determination function of acquiring a parameter value corresponding to each of terminal-side determination items and determining whether or not the parameter value satisfies a satisfaction condition, with respect to at least one terminal-side determination item defining the satisfaction condition to be satisfied for the parameter acquirable by the terminal, in response to a start request of QoS control from the application;
a request function of controlling the quality-of-service management device to provide QoS control when it is determined using the first determination function that the satisfaction condition of the terminal-side determination item is satisfied;
a function of recording first log information including a result of processing regarding each terminal-side determination item in the terminal; and a function of transmitting the first log information recorded by the terminal to the quality-of-service management device at a predetermined trigger, wherein the terminal-side determination item is a place in which the terminal is located.

28. A non-transitory computer-readable recording medium storing a quality-of-service management program for causing a computer to function as a server configured to manage a status of QoS control regarding quality of service of communication and be able to communicate with a terminal, an application as a QoS control target being executed in the terminal, the quality-of-service management program causing the computer to realize:

a second determination function of acquiring a parameter value corresponding to each of quality-of-service management device-side determination items and determining whether or not the parameter value satisfies a satisfaction condition, with respect to at least one quality-of-service management device-side determination item defining the satisfaction condition to be satisfied for the parameter acquirable by the server, in response to control of provision of the QoS control from the terminal in the server;

when it is determined using the second determination function that the corresponding satisfaction condition of the quality-of-service management device-side determination item is satisfied, starting the QoS control for the application or the terminal, or causing the terminal to execute the QoS control for the application by notifying the terminal of guarantee determination information including a determination result indicating that it is determined that the satisfaction condition is satisfied;

a function of recording second log information including a result of processing regarding each quality-of-service management device-side determination item in the server, and a function of transmitting the second log information recorded by the server to the terminal at a predetermined trigger, wherein the quality-of-service management device-side determination item is a place in which the terminal is located.

* * * * *